US012461284B2

(12) United States Patent
Busse et al.

(10) Patent No.: US 12,461,284 B2

(45) Date of Patent: Nov. 4, 2025

(54) WIDEBAND ANTIREFLECTIVE SURFACE STRUCTURES FOR OPTICS AND METHODS OF MANUFACTURING THE SAME

(71) Applicant: The Government of the United States, as represented by the Secretary of the Navy, Washington, DC (US)

(72) Inventors: Lynda E. Busse, Alexandria, VA (US); Leslie B. Shaw, Washington, DC (US); Jesse A. Frantz, Woodbridge, VA (US); Jasbinder S. Sanghera, Ashburn, VA (US); Ishwar D. Aggarwal, Charlotte, NC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 399 days.

(21) Appl. No.: 16/994,537

(22) Filed: Aug. 14, 2020

(65) Prior Publication Data

US 2021/0048561 A1 Feb. 18, 2021

Related U.S. Application Data

(60) Provisional application No. 62/886,579, filed on Aug. 14, 2019.

(51) Int. Cl.
*G02B 1/118* (2015.01)

(52) U.S. Cl.
CPC .................................... *G02B 1/118* (2013.01)

(58) Field of Classification Search
CPC ....... B32B 3/30; B32B 7/023; B32B 2307/40; Y10T 428/24355; G02B 1/11; G02B 1/118
See application file for complete search history.

(56) References Cited

U.S. PATENT DOCUMENTS 4,229,233 A 10/1980 Hansen et al.
8,187,481 B1 5/2012 Hobbs
(Continued)

FOREIGN PATENT DOCUMENTS

WO WO-2012144954 A1 * 10/2012 ............. B82Y 20/00
WO WO-2015145831 A1 * 10/2015 ........... B29C 59/046
WO WO-2018117710 A1 * 6/2018 ........... A61B 5/0086

OTHER PUBLICATIONS

W. H. Southwell, "Gradient-index antireflection coatings," Opt. Lett. 8, 584-586 (1983).
(Continued)

*Primary Examiner* — Zachary M Davis
(74) *Attorney, Agent, or Firm* — US Naval Research Laboratory

(57) ABSTRACT

An antireflection optical element formed from an optical material. The optical material includes a first plurality of antireflective surface structures in the form of first protuberances from the optical material. The first plurality of antireflective surface structures are constructed to aid in transmission of a first wavelength range through the optical material. Also included are a second plurality of antireflective surface structures in the form second protuberances from the first plurality of antireflective surface structures. The second plurality of antireflective surface structures are constructed to aid in transmission a second wavelength range through the optical material. The first wavelength range comprises longer wavelengths than the second wavelength range.

9 Claims, 25 Drawing Sheets

206B
H
W
206A
208B
H
W
208A
210B
H
210A

(56) References Cited

U.S. PATENT DOCUMENTS

| | | | | |
|---|---|---|---|---|
| 2014/0320969 | A1* | 10/2014 | Lee | G02B 1/118 359/601 |
| 2018/0172882 | A1* | 6/2018 | Frantz | G02B 1/113 |
| 2020/0116898 | A1* | 4/2020 | Oh | A61B 5/14552 |

OTHER PUBLICATIONS

W. H. Southwell, "Pyramid-array surface-relief structures producing antireflection index matching on optical surfaces," J. Opt. Soc. Am. A 8, p. 549-553 (1991).

J. J. Cowan, "Aztec surface-relief vol. diffractive structure," J. Opt. Soc. Am. A 7, p. 1529-1544 (1990).

T. Lohmueller, R. Brunner, and J.P. Spatz, "Improved Properties of Optical Surfaces by Following the Example of the 'Moth Eye'," Biomimetics Learning From Nature, ed. by A. Mukherjee, (Intech, 2010) , Ch. 22.

Y. Kanamori , H. Kikuta, and K Hane, "Broadband antireflection gratings for glass substrates fabricated by fast atom beam etching," Jpn. J. Appl. Phys. 39, p. L 735-L 737 (2000).

C. Aydin, A. Zaslavsky, G. J. Sonek, and J. Goldstein, "Reduction of reflection losses in ZnGeP2 using motheye antireflection surface relief structures," Appl. Phys. Lett. 80, p. 2242-2244 (2002).

D. S. Hobbs, B. D. MacLeod, and J. R. Riccobono, "Design, fabrication, and measured performance of antireflecting surface textures in infrared transmitting materials," Proc. SPIE 5786, p. 40-57 (2005).

M. J. Minot, "Single-layer, gradient refractive index antireflection films effective from 0.35 to 2.5 μ," J. Opt. Soc. Am., 66, p. 515-519 (1976).

L. M. Cook, W. H. Lowdermilk, D. Milam and J. E. Swain, "Antireflective surfaces for high-energy laser optics formed by neutral solution processing," Appl. Opt. 21, p. 1482-1485 (1982).

L. E. Busse, J.A. Frantz, L. B. Shaw, J. S. Sanghera, "A review of antireflective surface structures on laser optics and windows," Appl. Opt. 54, F303-F310 (2015).

L. E. Busse, C. M. Florea, J. A. Frantz, L. B. Shaw, I. D. Aggarwal, M. K. Poutous, R. Joshi and J. S. Sanghera, "Anti-reflective surface structures for spinel ceramics and fused silica windows, lenses and optical fibers," Opt. Mat. Exp. 4, p. 2504-2515 (2014).

* cited by examiner

WIDEBAND ANTIREFLECTIVE SURFACE STRUCTURES FOR OPTICS AND METHODS OF MANUFACTURING THE SAME

BACKGROUND

Field of the Invention

The present application relates generally to multiple level antireflective surface structures which are designed to transmit light over a wider range of wavelengths than single level antireflective surface structures.

Description of Related Art

It is well known that when light encounters a different medium (such as an optical component) with a different index of refraction that reflections occur from the surface of new medium. These Fresnel reflections not only cause a loss in transmission through the optic but also serious problems for an optical system. These problems include stray light and ghost reflections in a multi-element optical train and back reflections with the potential for feedback into a laser source. The traditional solution to these problems has been to apply antireflective coatings to the surface of the optical element. An antireflective (AR) coating comprises thin film dielectric stacks of material that are specifically designed to have alternating high and low refractive indices, causing destructive interference of the reflected light from the layer to layer interfaces of the substrate and the substrate to air interfaces. These coatings, however, have serious limitations. AR coatings have significantly lower laser induced damage threshold (LIDT) than that of the substrate and can also suffer from environmental degradation and delamination under thermal cycling due to the different thermal expansions of the coatings and the substrate.

One alternative to AR coatings is to pattern the surface directly with surface structures, an example of which is shown in FIG. 1A. FIG. 1A shows a substrate optical material 102 with antireflective surface structures 104A-C disposed thereon, where 104A-C consist of the same optical material as 102. This process does not involve applying a coating of other material(s) to the substrate, but rather fabricating the specific microstructures 104A-C into the surface of the optical material 102.

However, there is limitation on the bandwidth of optimum transmission for an optical element such as that shown in FIG. 1A, because once the dimensions of the microstructures 104A-C are determined, the wavelength range over which those microstructures 104A-C are effective in reducing reflections is also set. For example, FIG. 1B shows the percentage of transmission for antireflective surface structures formed on the surface of a spinel ceramic and which are designed for high transmission at a wavelength of 1.0 micron (1000 nm) (106), the percentage of transmission for an untreated optic with no antireflective structures or coatings (108), and the maximum theoretical transmission (110). As shown in FIG. 1B, the transmission percentage for the spinel ceramic with the antireflective surface structures 104A-C formed thereon drops significantly as the wavelength shifts towards the visible range. This inherent, short wavelength edge of the transmission spectrum for the material with AR surface structures is due to the spacing of the surface features, causing significant diffraction of light (and hence optical transmission loss) at shorter wavelengths impinging on the surface. This renders it nearly impossible to improve transmission of shorter wavelengths in an optical element with antireflective surface structures designed for a longer wavelength. It would be preferable to have antireflective surface structures that would allow for greater transmission across a wider wavelength range

SUMMARY OF THE INVENTION

One or more the above limitations may be diminished by structures and methods described herein.

In one embodiment, an antireflection optical element is provided. The element includes an optical material that includes a first plurality of antireflective surface structures in the form of first protuberances from the optical material, wherein the first plurality of antireflective surface structures are constructed to aid in transmission of a first wavelength range through the optical material, and a second plurality of antireflective surface structures in the form of second protuberances from the first plurality of antireflective surface structures, wherein the second plurality of antireflective surface structures are constructed to aid in transmission of a second wavelength range through the optical material. The first wavelength range comprises longer wavelengths than the second wavelength range.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

Figure 1A:
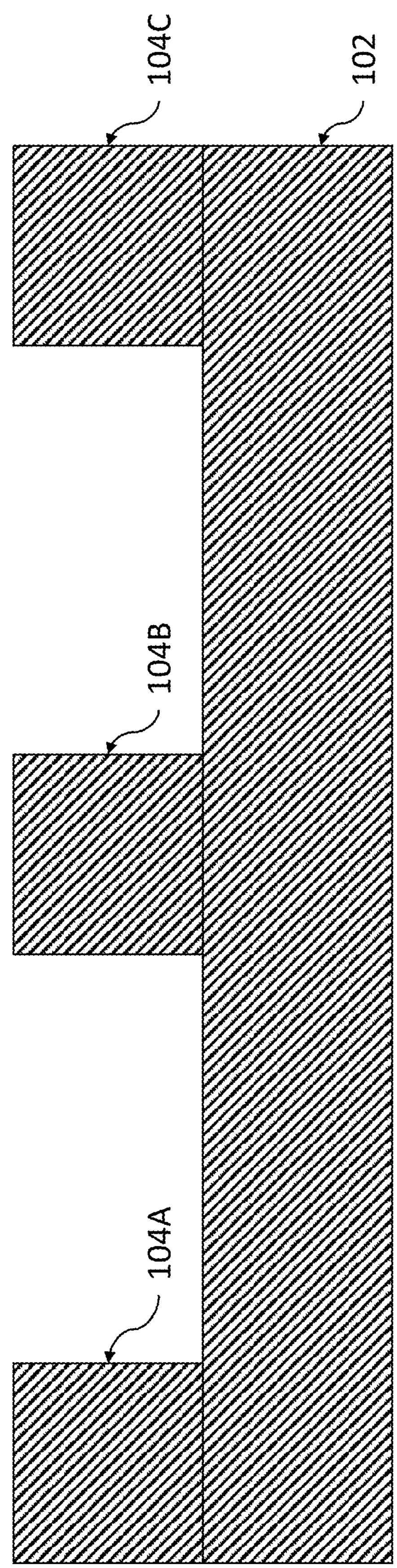
FIG. 1A is a cross-sectional view of an optical element that includes a plurality of first level antireflective surface structures.
Figure 1B:
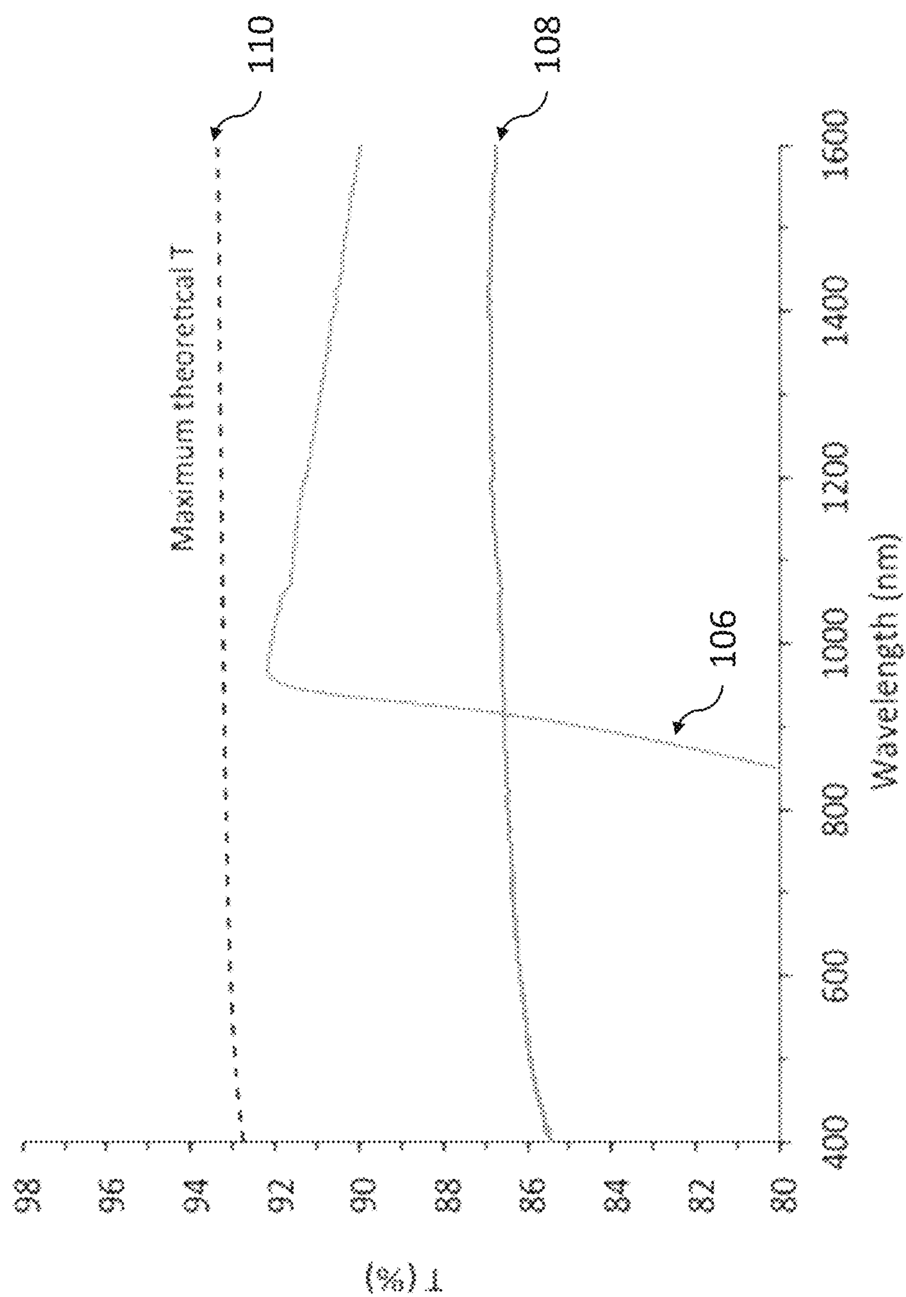
FIG. 1B is a graph illustrating the transmission percentages for example antireflective surface structures formed on one surface of spinel ceramic and which are designed for highest transmission at a wavelength of 1.0 micron, an untreated optic with no antireflective structures or coatings, and a maximum theoretical transmission.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein are multiple level antireflective surface structures.

Figure 2A:
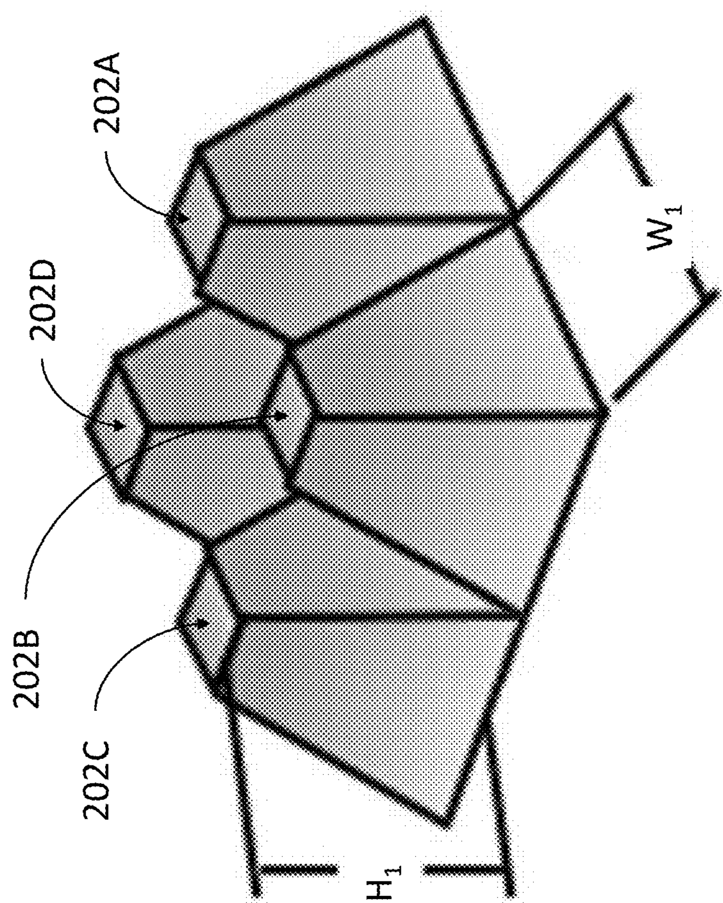
FIG. 2A is a perspective view of a plurality of first level antireflective surface structures according to one embodiment.
Figure 2B:
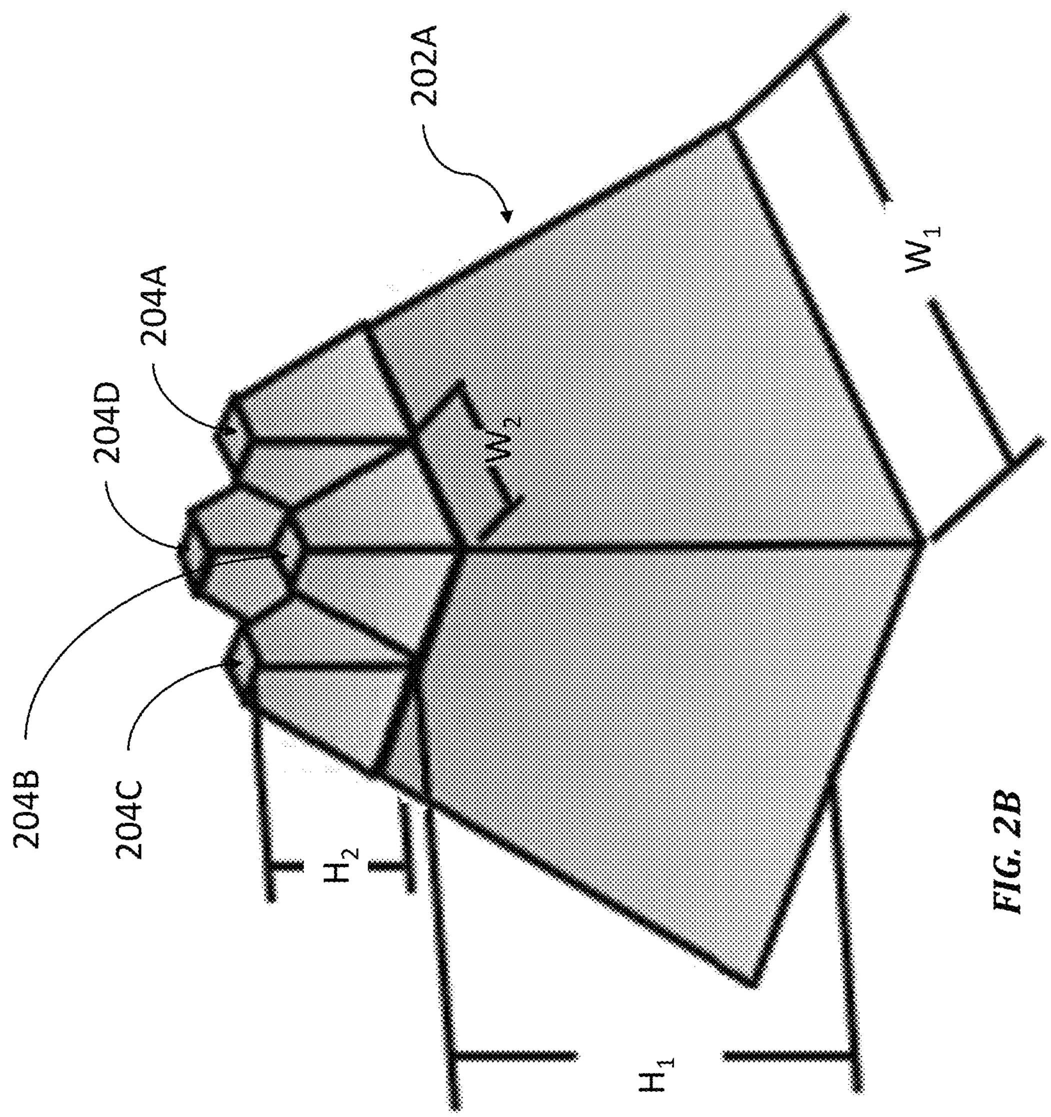
FIG. 2B is a perspective view of a plurality of second level antireflective surface structures disposed on a first level antireflective surface structure according to one embodiment.
Figure 2C:
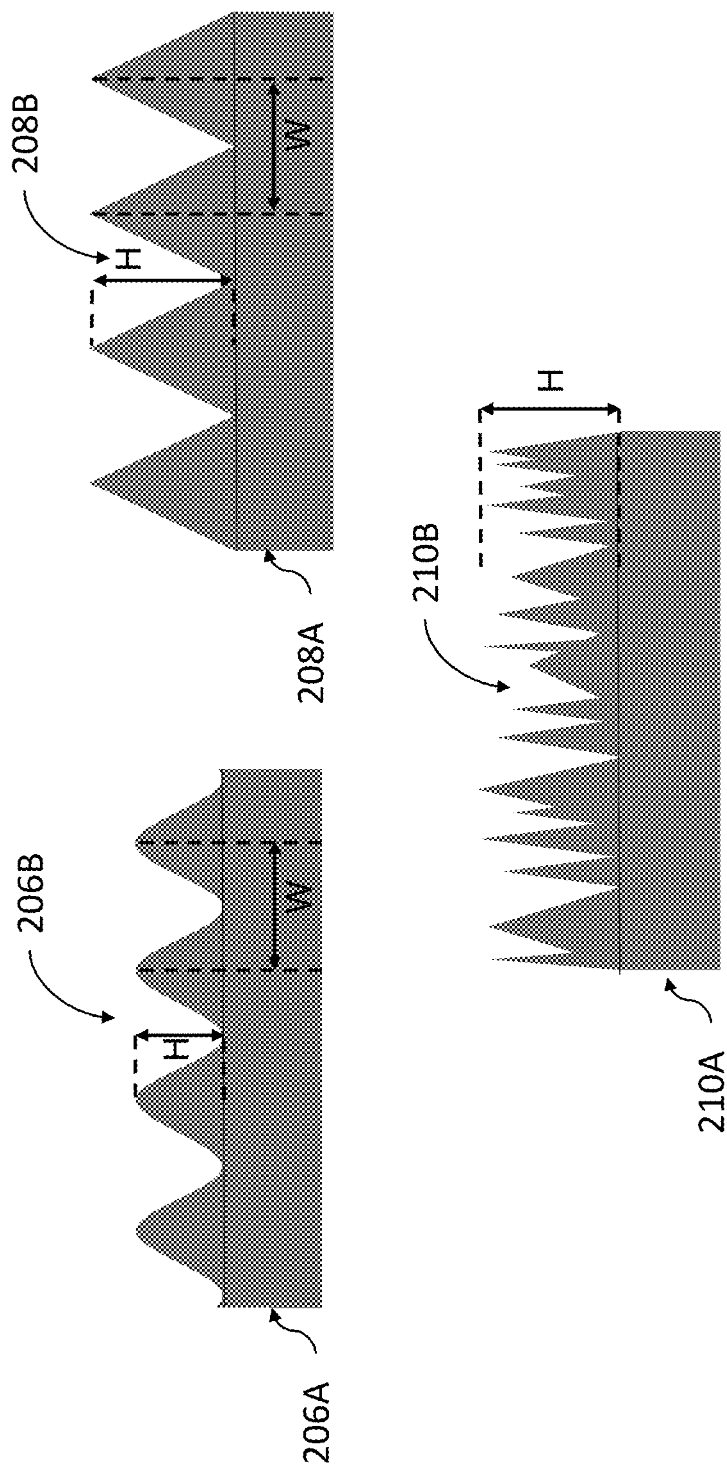
FIG. 2C are cross-sectional views of other types of antireflective surface structures, including: sinusoidal cross-sections, triangular cross-sections, as well a cross-section of random surface structures disposed on an optical element.

FIGS. 2A and 2B are perspective views of exemplary multilevel antireflective surface structures according to one embodiment. While the antireflective surface structures shown in FIGS. 2A and 2B are depicted as three-dimensional trapezoids, this is merely exemplary of one design. As shown in FIGS. 2C and 8, the anti-reflective surface structures may have a sinusoidal cross-sectional shape, a triangular cross-sectional shape, a rectangular cross-sectional shape, a tapered curved trapezoidal cross-sectional shape, or a cross-sectional shape whose dimensions, spacing, and shape are random. As described below, the antireflective surface structures depend on the particular material and wavelength region for which transmission is optimized.

FIG. 2A is a perspective view of a first level antireflective surfaces structures 202A-D with dimensions $W_1$, $H_1$, and a top surface area of $A_1$. FIG. 2B shows a second level of antireflective surface structures 204A-D disposed on top of one of the first level antireflective structures, in this case 202A. However, as one of ordinary skill will appreciate, the second level antireflective surface structures 204A-D are preferably formed on each of the first level antireflective surface structures 202A-D. The second level antireflective surface structures 204A-D have dimensions $H_2$, $W_2$, and a top surface area of $A_2$. As discussed in detail below, the values for dimensions $H_1$, $W_1$, $H_2$, $W_2$, $A_1$, and $A_2$ are selected to increase transmission across a certain wavelength range. This is because the antireflective surface structures may be thought of as providing a gradual transition from air to the optical material. By selecting appropriate values of $H_1$, $W_1$, $H_2$, $W_2$, $A_1$, and $A_2$ for a given optical material, with a certain refractive index, one or more desired wavelength ranges may be transmitted through the antireflective surface structures 202A and 204A-D, and into the optical material on which the first level of antireflective surface structures 202A-D are formed. Given the refractive index of the optical material, and the desired wavelength range over which an antireflective surface structure is desired to aid transmission, techniques such as finite difference time domain analysis or rigorous coupled-wave analysis may be used to model the antireflective surface structure's design and shape, as described in "Gradient-index antireflection coatings", Opt. Lett. 8, 584-586 (1983) and "Pyramid-array surface-relief structures producing antireflection index matching on optical surfaces" J. Opt. Soc. Am. A 8, p. 549-553 (1991), both of which are authored by W. H. Southwell and which are incorporated by reference in their entirety as if fully set forth herein.

As mentioned above, the second level antireflective surface structures 204A-D are not formed solely on structure 202A, rather the second level antireflective surface structures 204A-D may be formed on each of the first level antireflective surface structures. Moreover, while only four first level antireflective surfaces structures 202A-D are shown in FIG. 2A, a person of ordinary skill will recognize that those structures may be repeatedly formed across the entirety of the optical element or a portion thereof that is designed to receive incident light. Having described first and second level antireflective surface structures from a perspective viewpoint, attention will now be directed to processes for forming first and second antireflective surface structures with reference to FIGS. 3A-5 and 11-13.

Figure 3A:
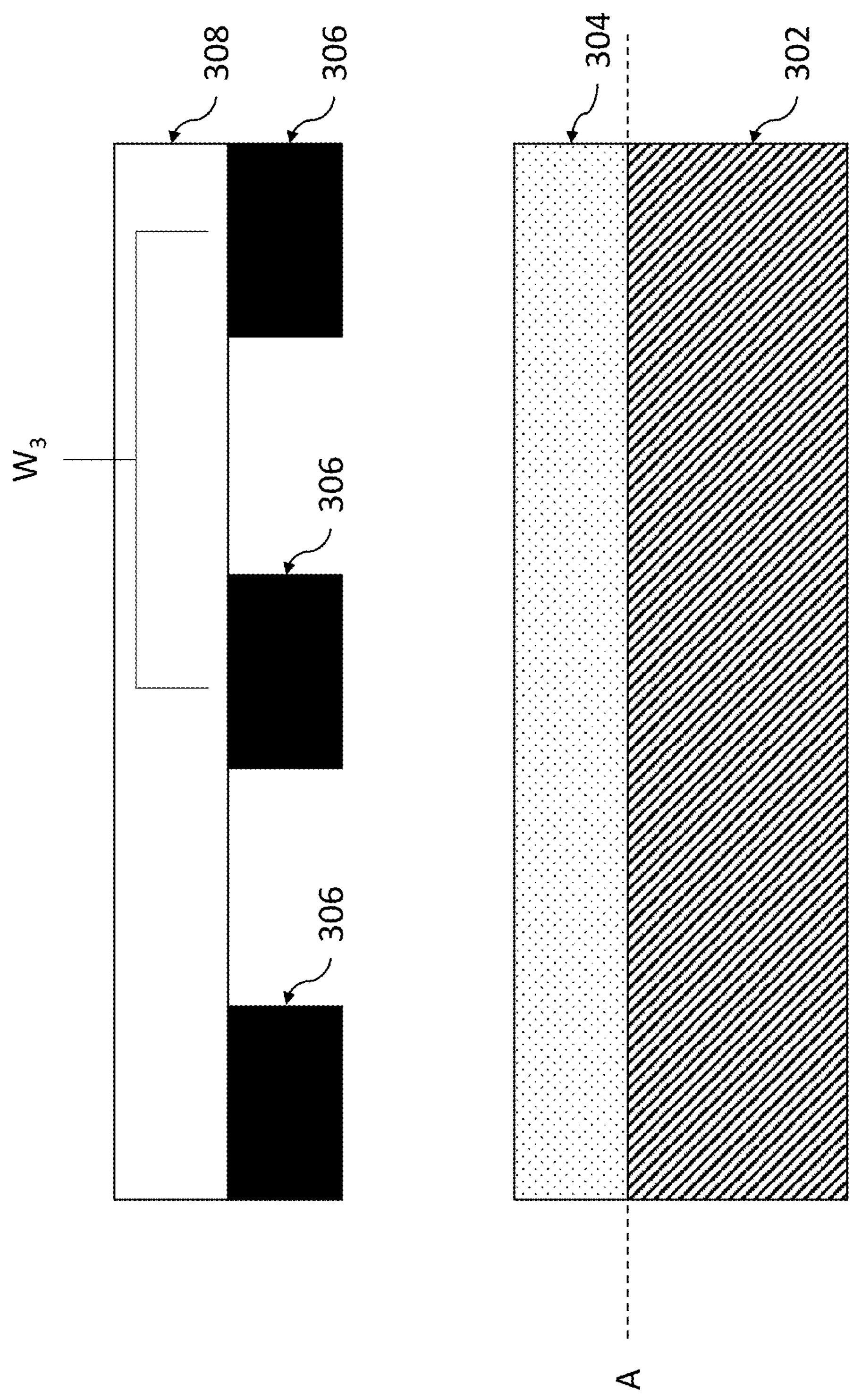
FIG. 3A is a cross-sectional view illustrating one step in a method of forming a plurality of first level antireflective elements for an antireflection optical element according to one embodiment.

FIG. 3A is a cross-sectional view of an optical element 302 with photoresist 304 disposed on a surface thereof. Also shown is a reference line "A" which provides a reference point for visualizing the result of the etching process discussed below. Here, the optical material 302 may be a glass, crystal, ceramic, or a semiconductor material. Glasses can include silica, silicate glasses, phosphate glasses, fluoride glasses, and chalcogenide glasses. Ceramics can include alumina, spinel, zinc sulfide, zinc selenide, and sesquioxide ceramics such as yttrium aluminum garnate. Crystals could include diamond, germanium, silicon, III-V semiconductors, II-VI semiconductors. Disposed above the photoresist 304 is a mask 306 attached to a transparent substrate 308. Mask 306 is generated (in S1102) in accordance with the desired transmission region for the optical element. More specifically, mask 306 comprises a pattern that is designed to create a plurality of first level antireflective structures with a center-to-center spacing ($W_3$) that improves transmission of a particular wavelength region.

To improve transmission for a particular wavelength, the nominal center-to-center spacing between adjacent antireflective surface structures should be less than a nominal wavelength for which reduced reflection is desired divided by twice the refractive index of the optical material 302. This center-to-center spacing may, however, vary by a factor of 0.1 to 10. Similarly, the height of each antireflective surface structures is preferably one-half the nominal wavelength for which reduced reflection is desired. Again, however, this value may vary by a factor of 0.1 to 10. In addition, those skilled in the art will recognize that the shape of the individual surface structures will affect the transmission at each wavelength within the preferred waveband of interest and may thus be fabricated to have a tapered or sinusoidal profile as was shown in FIG. 2C. For example, a sinusoidal profile 206B or a tapered curved profile (such as 802A or 802B) may yield increased transmission relative to a straight tapered profile, as shown in FIGS. 2A and 2B. When an increase in transmission is desired for a range of wavelengths, the diffraction edge is determined by the surface structures' spacing as defined above, yielding the shortest wavelength for increased transmission for the optical element.

After the mask 306 is created based upon the desired center-to-center spacing $W_3$ between features in the first level of antireflective surface structures, the mask 306 is used to pattern the photoresist 304 deposited on the optical substrate 306. As one of ordinary skill will appreciate, the photoresist 304 can be either positive or negative. With positive photoresist, the areas that are exposed to light become soluble to a developer and are later removed whereas the areas that were shielded by the mask 306 remain insoluble to the developer and are therefore not removed during the developing process. If negative photoresist is used, the opposite is true. For brevity, this process of forming the antireflective surface structures will be described in conjunction with positive photoresist. However, negative photoresist may also be used in ways one of ordinary skill will appreciate.

Figure 3B:
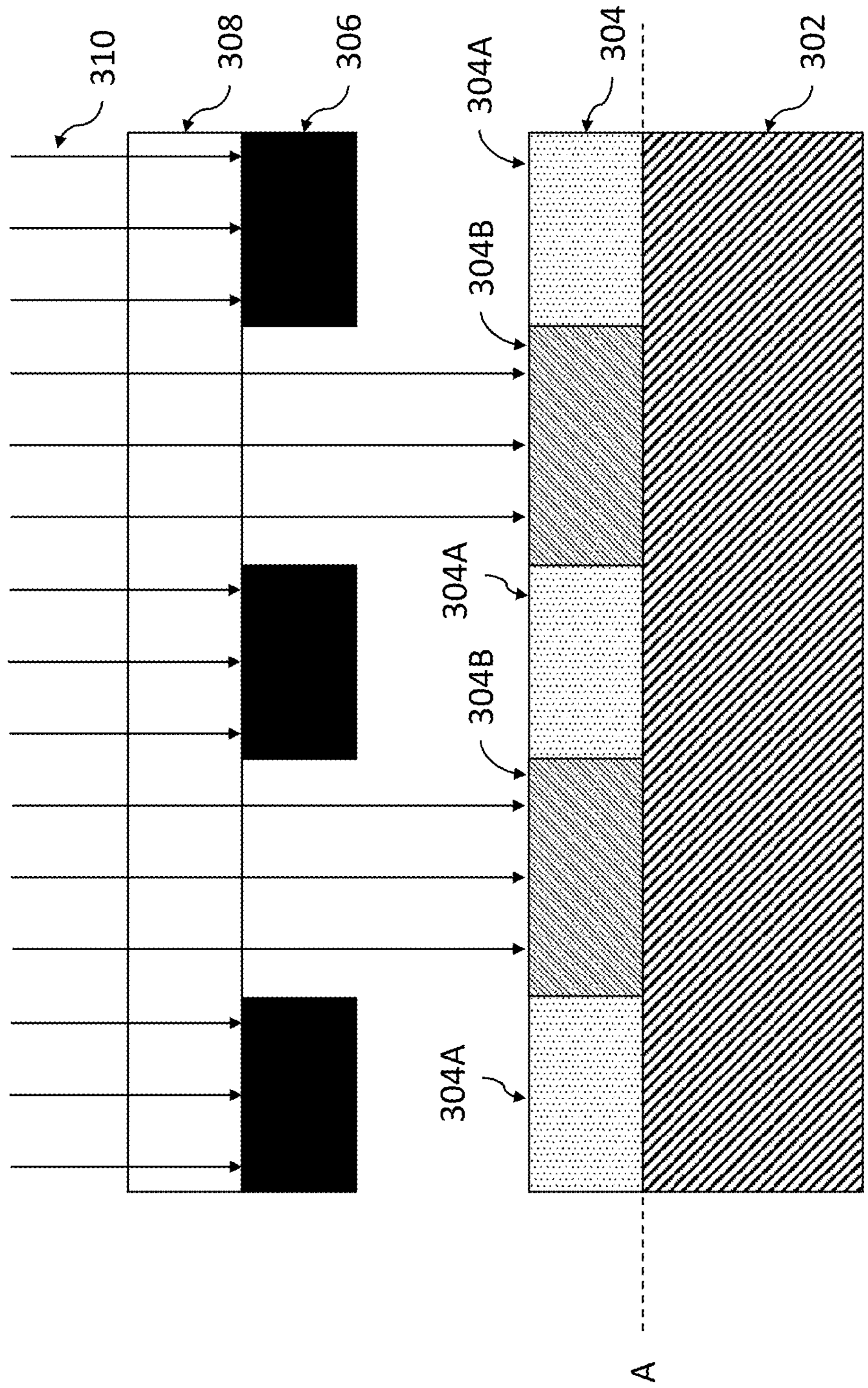
FIG. 3B is a cross-sectional view illustrating another step in the method of forming the plurality of first level antireflective elements for the antireflection optical element according to one embodiment.

Next, in S1104 the photoresist 304 disposed on the optical material 302 is patterned using mask 306, FIG. 3B is illustrative. In FIG. 3B, light 310 propagates through the transparent substrate 308 but is blocked by mask 306. However, light 310 that propagates through openings in the mask 306 is incident on certain regions, hereinafter called exposed regions 304B, of the photoresist 304. The photoresist in those exposed regions 304B undergoes a change which makes the photoresist 304 in the exposed regions 304B soluble to a developer, typically tetramethylammonium hydroxide (TMAH), and thus removable. Photoresist 304 in unexposed regions 304A, however, does not undergo a chemical change and therefore remains insoluble to the developer. Next, in S1106, the photoresist 304 in the exposed regions 304B is removed using the developer leaving the state depicted in FIG. 3C.

Figure 3C:
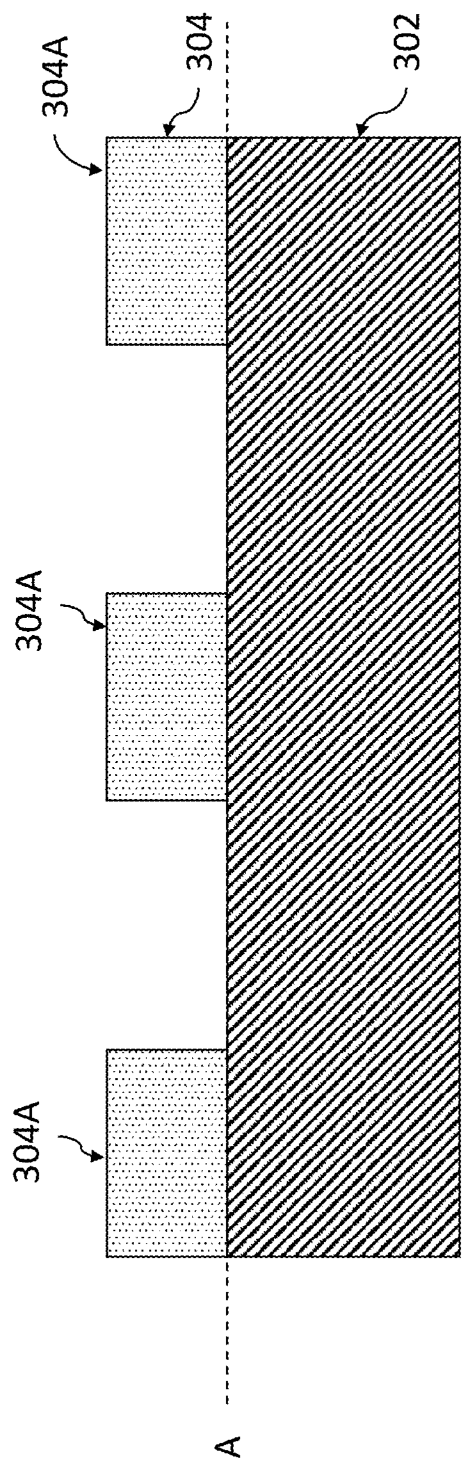
FIG. 3C is a cross-sectional view illustrating yet another step in the method of forming the plurality of first level antireflective elements for the antireflection optical element according to one embodiment.

As shown in FIG. 3C, portions of the optical material 302 are covered by photoresist 304A and whereas other portion of the optical material 302 are not. Those regions which are covered by photoresist are shielded, to a degree, from an etching process designed to remove the optical material 302. In contrast, regions which are not protected by photoresist 304 are exposed to the etching process and removed. Next, in S1108, in the preferred embodiment, a dry etching process such as reactive ion etching or ion milling, or alternatively, a wet chemical etching process is used to etch the portions of the optical material 302 that are not covered by photoresist 304 to thereby form the plurality of first level antireflective surface structures 312A-C. The result of the etching process is illustrated in FIG. 3D.

Figure 3D:
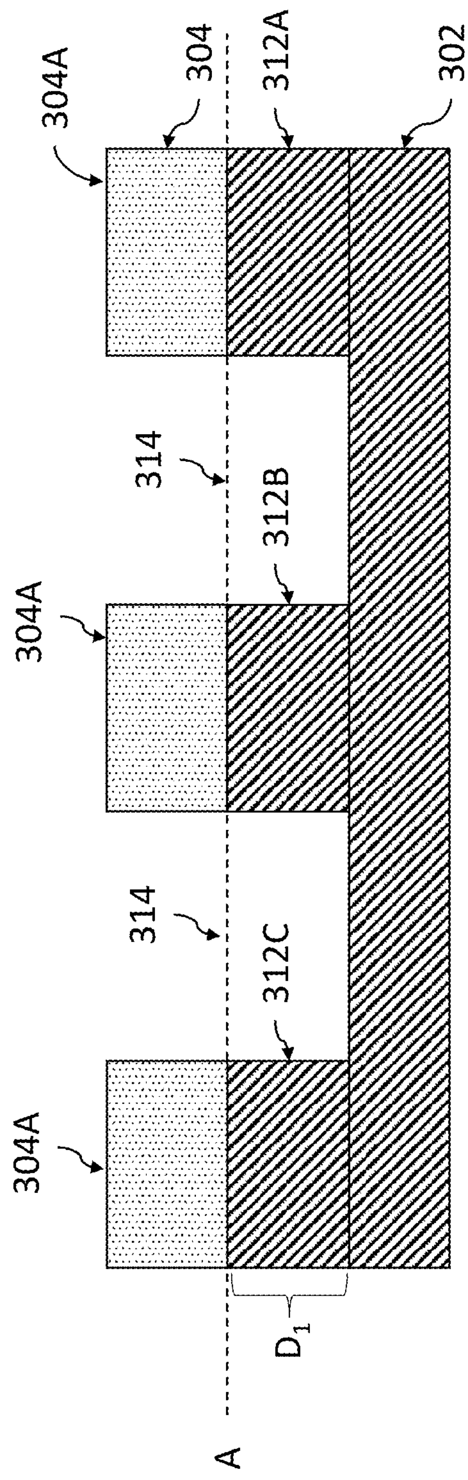
FIG. 3D is a cross-sectional view illustrating still another step in the method of forming the plurality of first level antireflective elements for the antireflection optical element according to one embodiment.
Figure 3E:
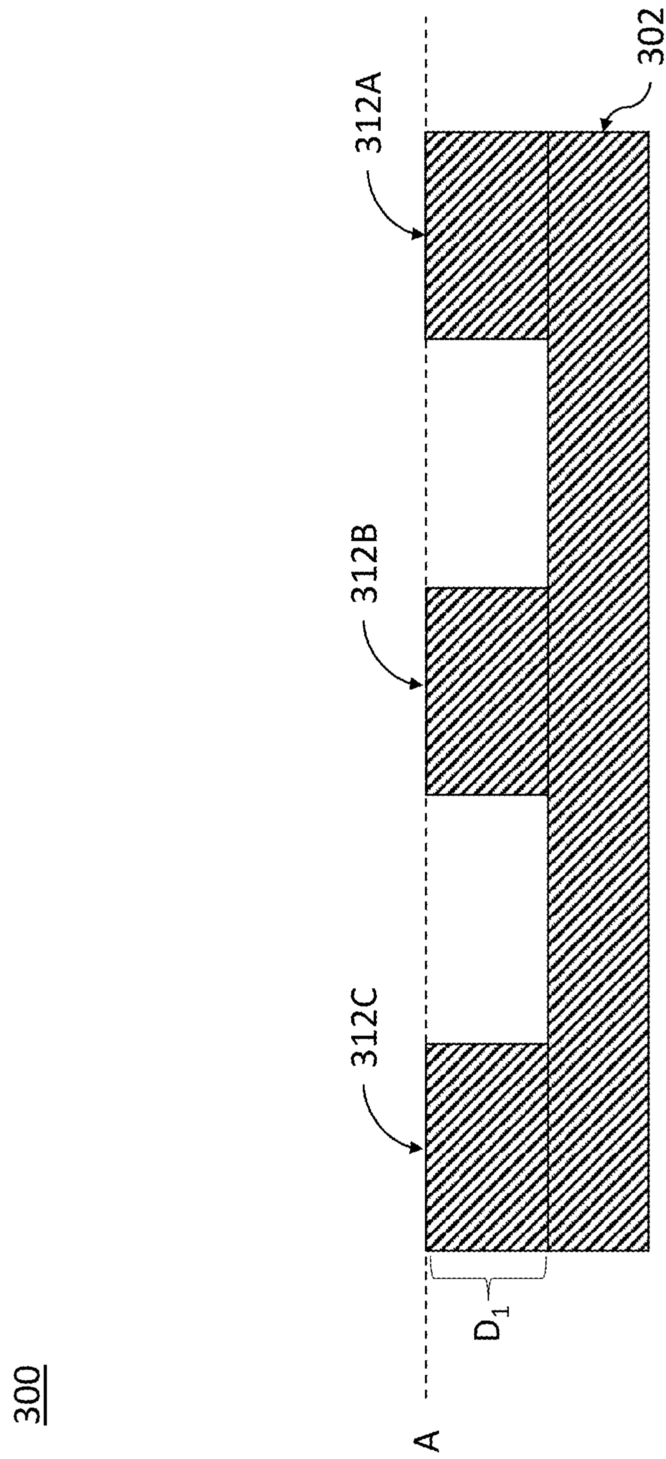
FIG. 3E is a cross-sectional view illustrating still yet another step in the method of forming the plurality of first level antireflective elements for the antireflection optical element according to one embodiment.

As shown in FIG. 3D, the etching process created a plurality of recesses 314 in the optical material 302. By controlling the etch rate and time, the depth $D_1$ of the recesses 314 can be controlled. The photoresist 304 may then be removed using a photoresist stripper or by plasma exposure. The result is illustrated in FIG. 3E. Removing the photoresist 304 reveals a plurality of first level antireflective surface structures 312A-C. The height of the plurality of first level antireflective surface structures 312A-C ($H_3$) is equal to the depth $D_1$ of the plurality of recesses 314. Thus, in this example, by controlling the etch rate in the etching process, the height ($H_3$) of the plurality of first level antireflective surface structures can be controlled to match the desired dimension based on the wavelength range over which the plurality of first level antireflective surface structures are designed to aid transmission.

As one of ordinary skill will appreciate, structures 312A-C are formed from the same material as the optical material 302, and are protuberances from the optical material 302. As one of ordinary skill will also appreciate, if the photoresist 304 is receptive to light within the desired transmission region, then it is not necessary to remove the photoresist 304 in S1108. Having described the formation of the first level of antireflective surface structures, attention will now be directed to forming the second level of antireflective surface structures with reference to FIGS. 11, 12, and 4A-5. Described below are two methods of forming the second level antireflective surface structures. The first method (S1110) is based around a second photolithography process that creates a second level of antireflective surface structures disposed on the first level of antireflective surface structures. The second method (S1112) is based around an ion etching process, a chemical etching process, or a laser irradiation process that creates second antireflective surface features with random dimensions and periodicity on top of the first level of antireflective surface structures.

Figure 12:
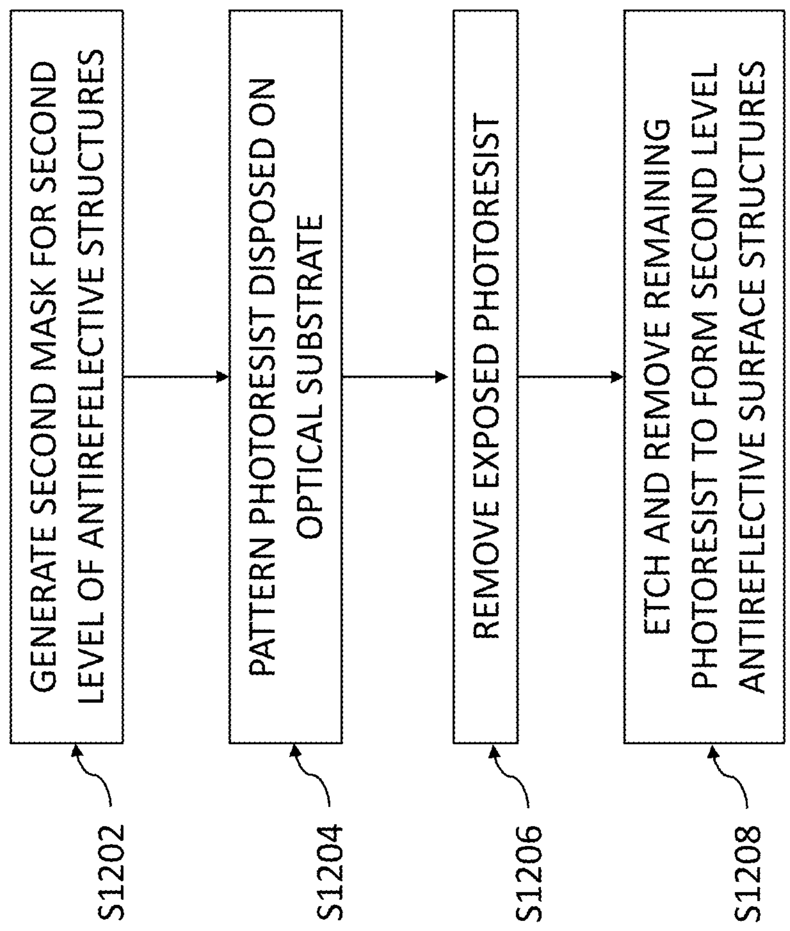
FIG. 12 is a flowchart illustrating a portion of the method of preparing an optical element that includes first and second level antireflective surface structures according to one embodiment.

The method performed in S1110 is shown in FIG. 12. Like in the process of forming the first level antireflective surface structures, the initial step (S1202) to creating the second level of antireflective surface structures is to create a mask 406 that defines, in part, the dimensions of the second level antireflective surface structures, e.g., a center-to-center spacing $W_4$ between two of the second level antireflective surface structures. Like with the first level of antireflective surface structures discussed above, the dimensions of the second level antireflective surface structures are determined based on a desired wavelength range over which transmission through the optical element is sought to be increased. Like the first level antireflective structures, the nominal center-to-center spacing between adjacent second level antireflective surface structures should be less than a nominal wavelength for which reduced reflection is desired divided by twice the refractive index of the optical material 302. This center-to-center spacing may, however, vary by a factor of 0.1 to 10. Similarly, the height of each of the second level antireflective surface structures is preferably one-half the nominal wavelength for which reduced reflection is desired. Again, however, this value may vary by a factor of 0.1 to 10. Thus, if one is seeking to increase transmission in the visible range, for example around 500 nm, then the height of the second level antireflective surfaces structures should, in one embodiment, be approximately 250 nm. If the first level antireflective surface structures are constructed to improve transmission in the infrared region, for example around 1 micron, then the height of the first level antireflective surface structures should be around 500 nm.

Alternatively, as discussed below, the second level antireflective surface structures may have random dimensions and shapes which reduce reflections in silicate glasses, silicon, and other materials. Such antireflective surface structures may be formed using reactive gas ion etching, chemical etching, and reactive gas ion etching. Such antireflective surface structures may also be created using laser irradiation, either with or without a reactive gas, in silicon and silicate glass materials.

Figure 4A:
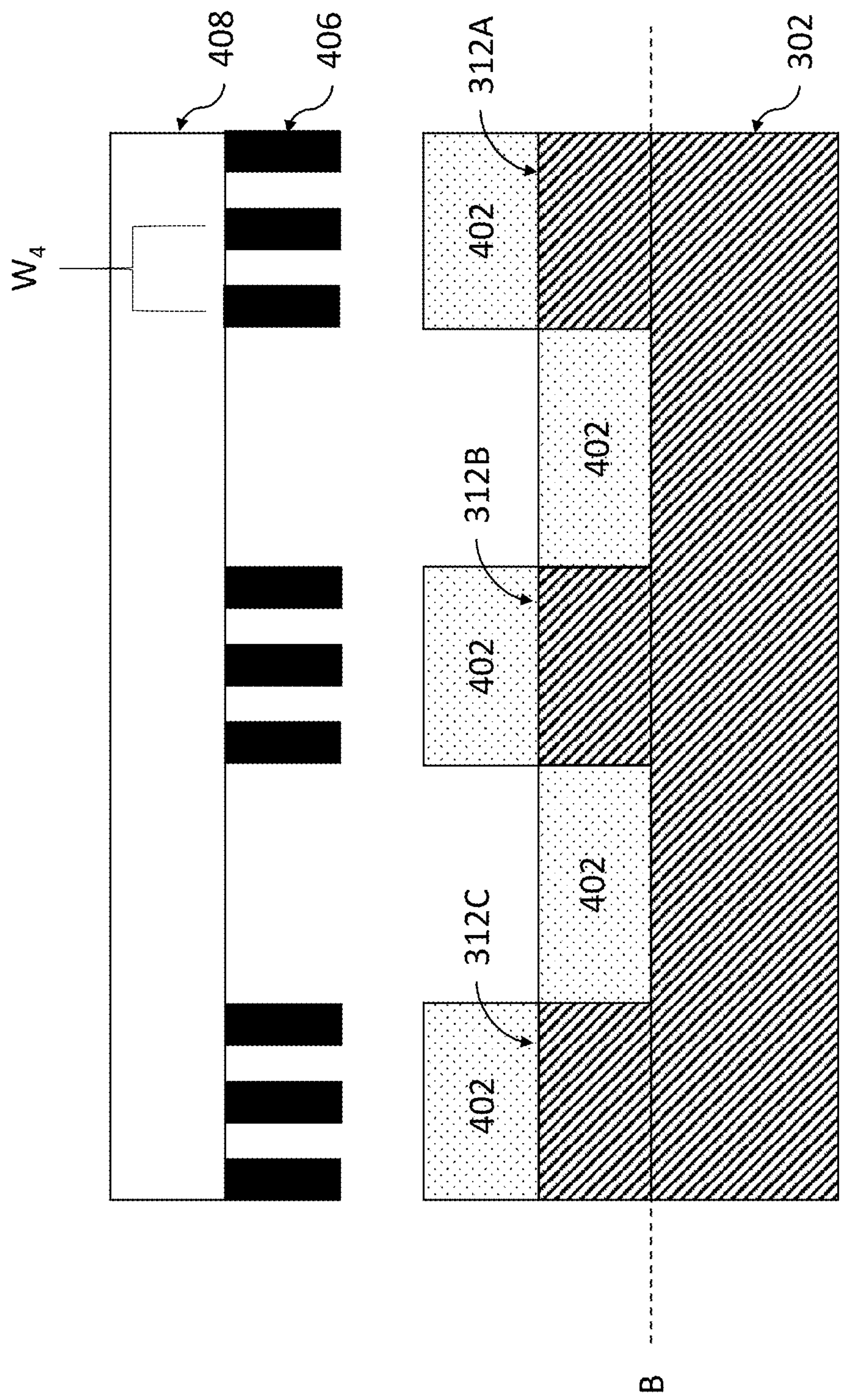
FIG. 4A is a cross-sectional view illustrating a step in the method of forming a plurality of second level antireflective elements for the antireflection optical element according to one embodiment.
Figure 4B:
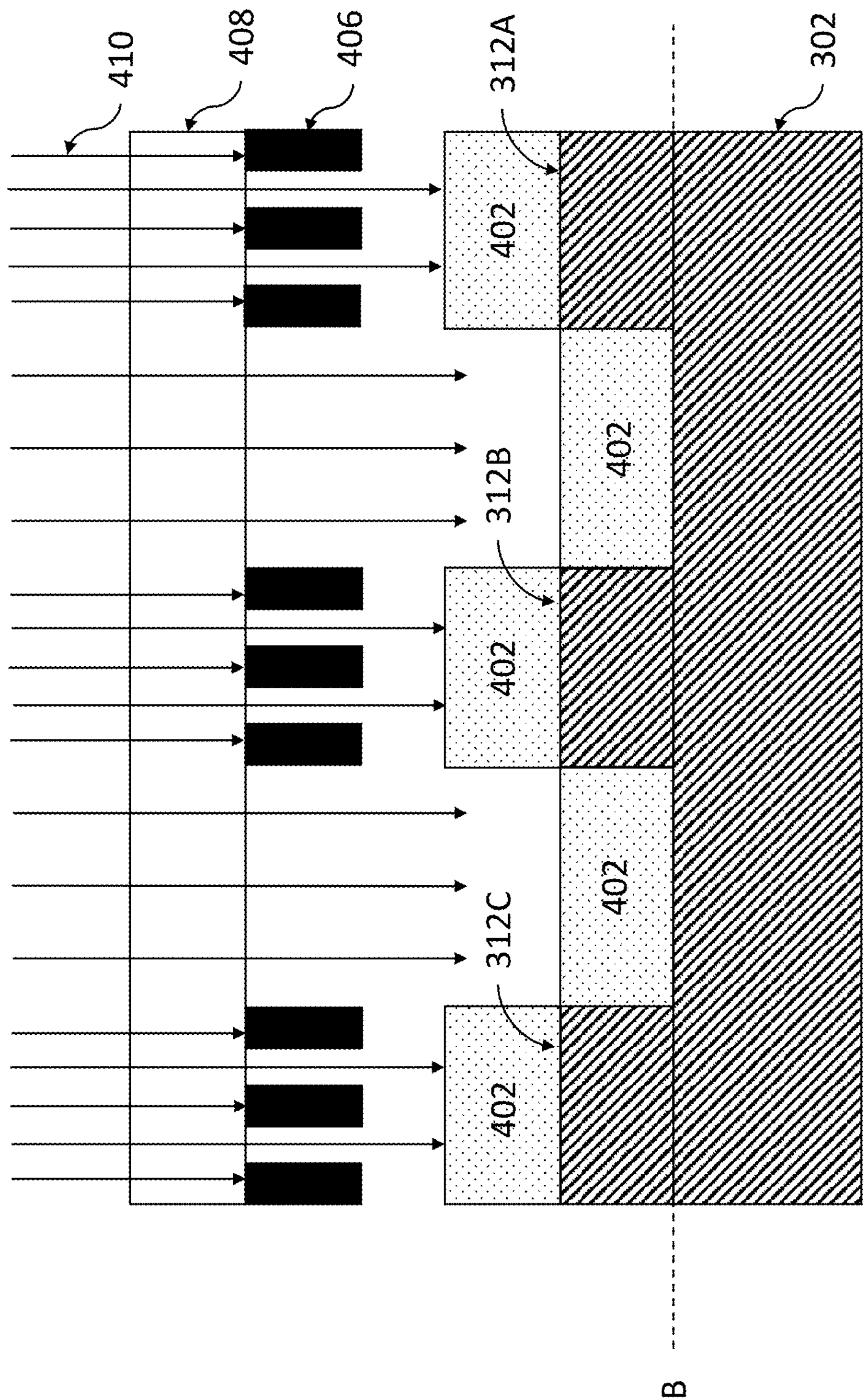
FIG. 4B is a cross-sectional view illustrating another step in the method of forming the plurality of second level antireflective elements for the antireflection optical element according to one embodiment.
Figure 4C:
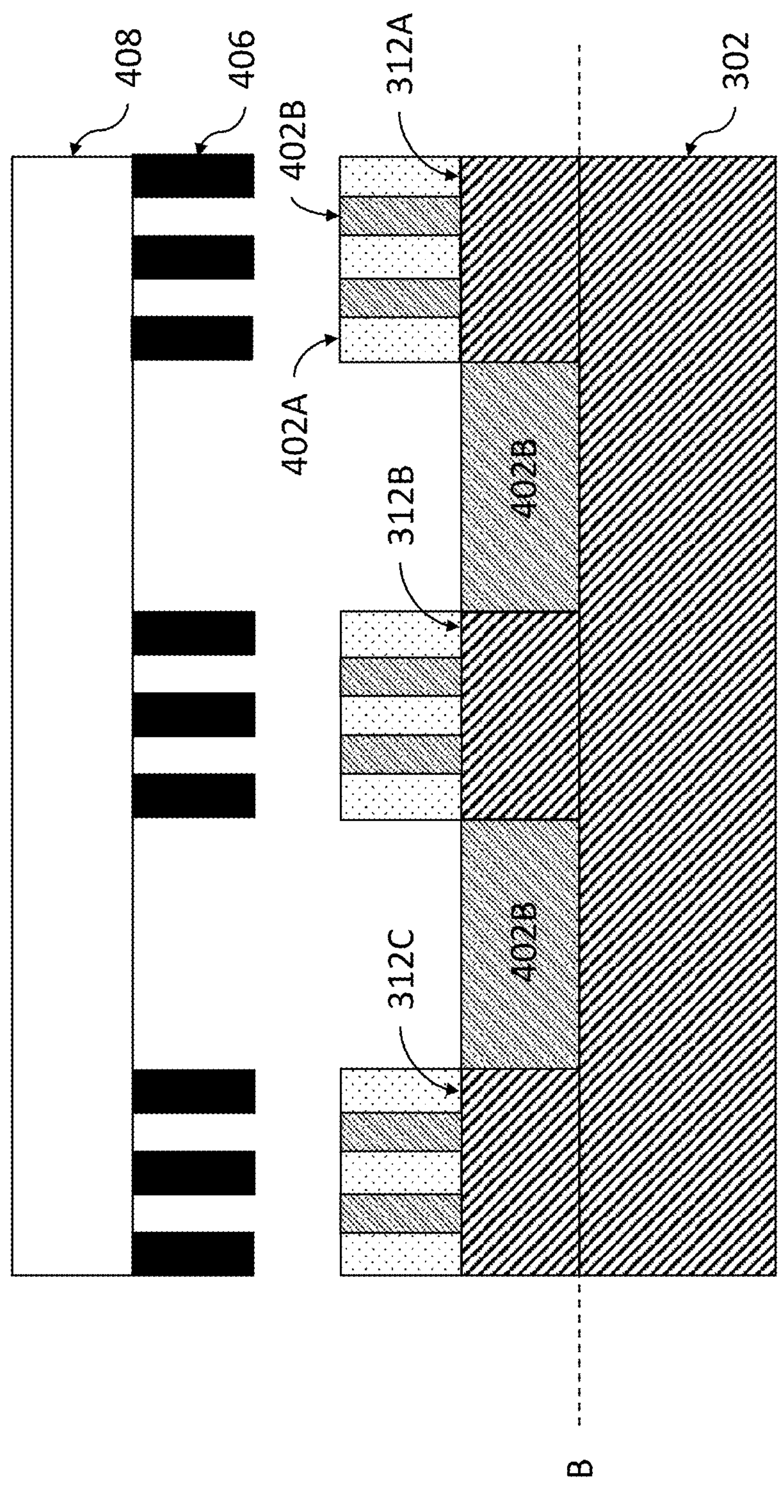
FIG. 4C is a cross-sectional view illustrating yet another step in the method of forming the plurality of second level antireflective elements for the antireflection optical element according to one embodiment.
Figure 4D:
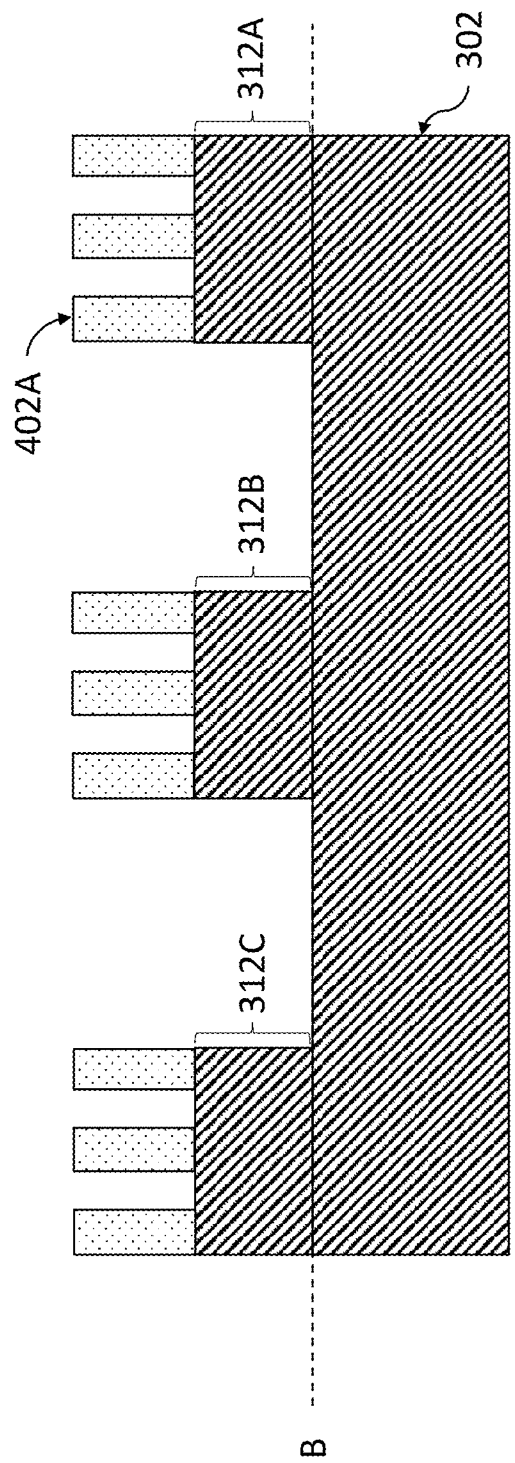
FIG. 4D is a cross-sectional view illustrating still another step in the method of forming the plurality of second level antireflective elements for the antireflection optical element according to one embodiment.
Figure 4E:
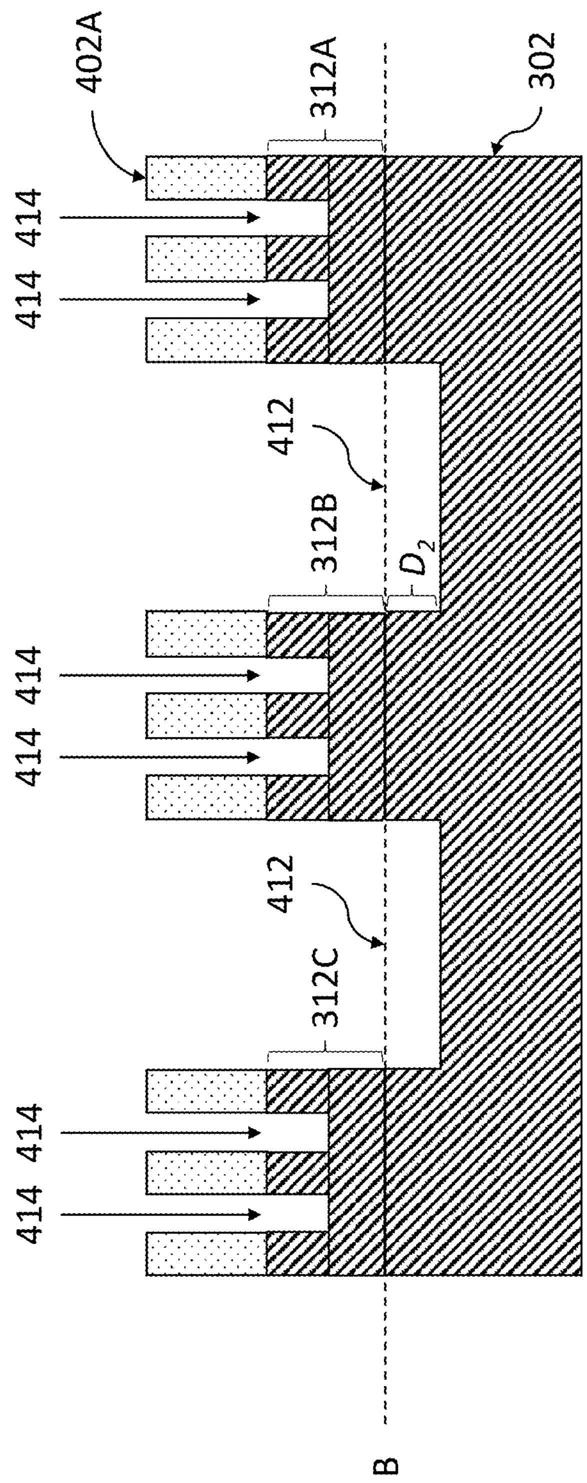
FIG. 4E is a cross-sectional view illustrating still yet another step in the method of forming the plurality of second level antireflective elements for the antireflection optical element according to one embodiment.

FIG. 4A shows the first level antireflective surfaces structures 312A-C and the optical material 302 with photoresist 402 deposited on both. A reference line "B" is also provided to mark the initial bottom of the antireflective surface structures 312A-C. Mask 406 is connected to a transparent substrate 408. Next, in S1204, the photoresist 402 that has been deposited on the first level antireflective surface structures 312A-C and the optical material 302 is patterned as illustrated in FIG. 4B. Light 410 is directed towards the optical material 302. Areas of photoresist 402 that are not covered by mask 406 are exposed by light 410 and chemically altered such that they become soluble to a developer, such as TMAH, as described above. In contrast, areas of photoresist 402 that are covered by mask 406 are not exposed by light 410 and therefore remain insoluble to the developer. This is illustrated in FIG. 4C. FIG. 4C shows areas of photoresist 402B that have been exposed to light 410 and areas of photoresist 402A that have not been exposed to light 410. Next, in S1206, the exposed areas of photoresist 402B are removed using a developer, such as at TMAH. The result is shown in FIG. 4D where the unexposed areas 402A remain disposed on the plurality of first level antireflective structures 312A-C.

Next, in S1208, an etching process is performed to create the plurality of second level antireflective structures. This etching process may be either a wet chemical etch or a dry etch process, such as reactive ion etching or ion milling. The second level antireflective structures' shapes may or may not be identical to, or substantially the same as, those used for the first level antireflective surface structures set of features, since the design may show optimum transmission with a different sidewall slope or profile for the second level antireflective surface structures. The portions of the first level antireflective structures 312A-C that are covered by the unexposed areas 402A of photoresist are not etched, whereas the areas 414 between the unexposed areas 402A (corresponding to the exposed areas 402B) are etched. In addition, the areas 412 between the plurality of first antireflective structures 312A-C are also etched since they are not covered by photoresist. Areas 412 and 414 are etched at approximately the same rate thereby creating a plurality of second level antireflective surfaces structures 416A-I while simultaneously translating the plurality of first level antireflective structures 312A-C by a depth $D_2$. The depth $D_2$ is controlled almost exclusively by the etch rate and etch time. Thus, the width and depth of the plurality of second level antireflective surfaces are controlled by two factors: (i) the center-to-center spacing $W_4$ dictated by mask 406, and (ii) the etch rate and time. After the etching process is completed in S1208, the remaining photoresist 402A may optionally be removed using an acid or another chemical etchant. The resulting optic 400 is shown in FIG. 4F.

Figure 4F:
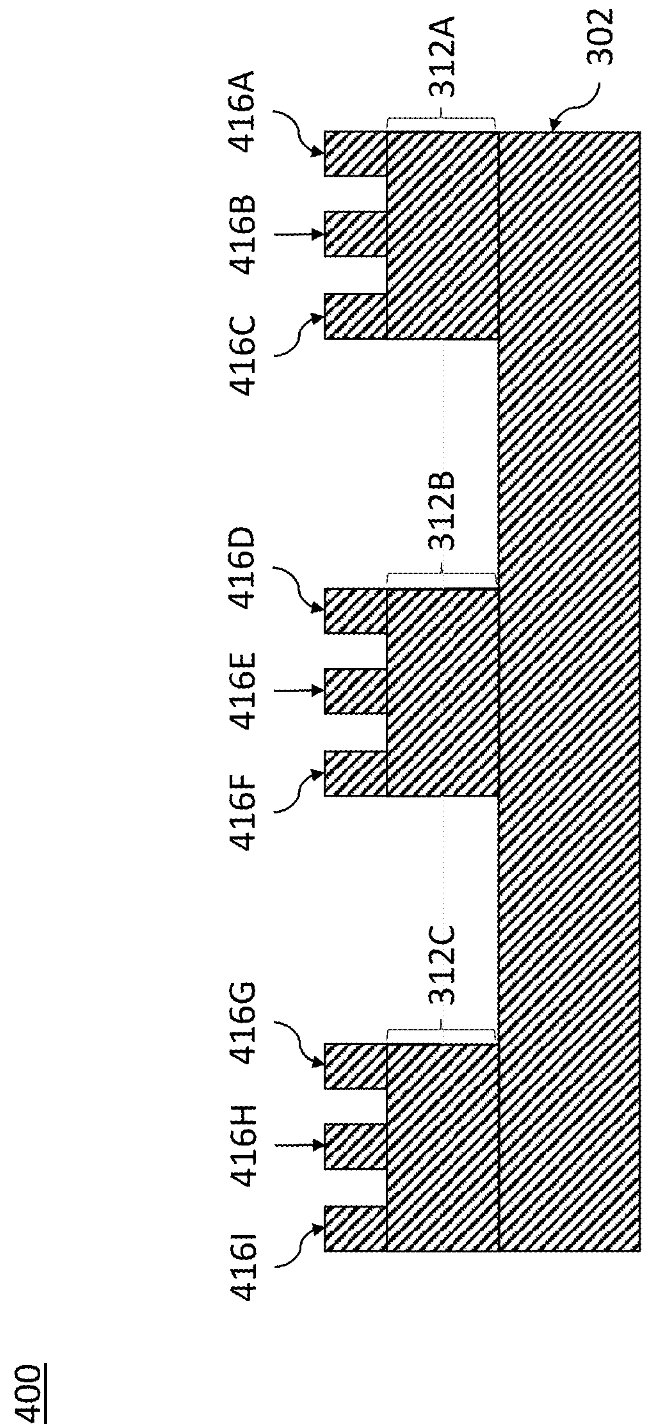
FIG. 4F is a cross-sectional view illustrating still yet another step in the method of forming the plurality of second level antireflective elements for the antireflection optical element according to one embodiment.
Figure 5:
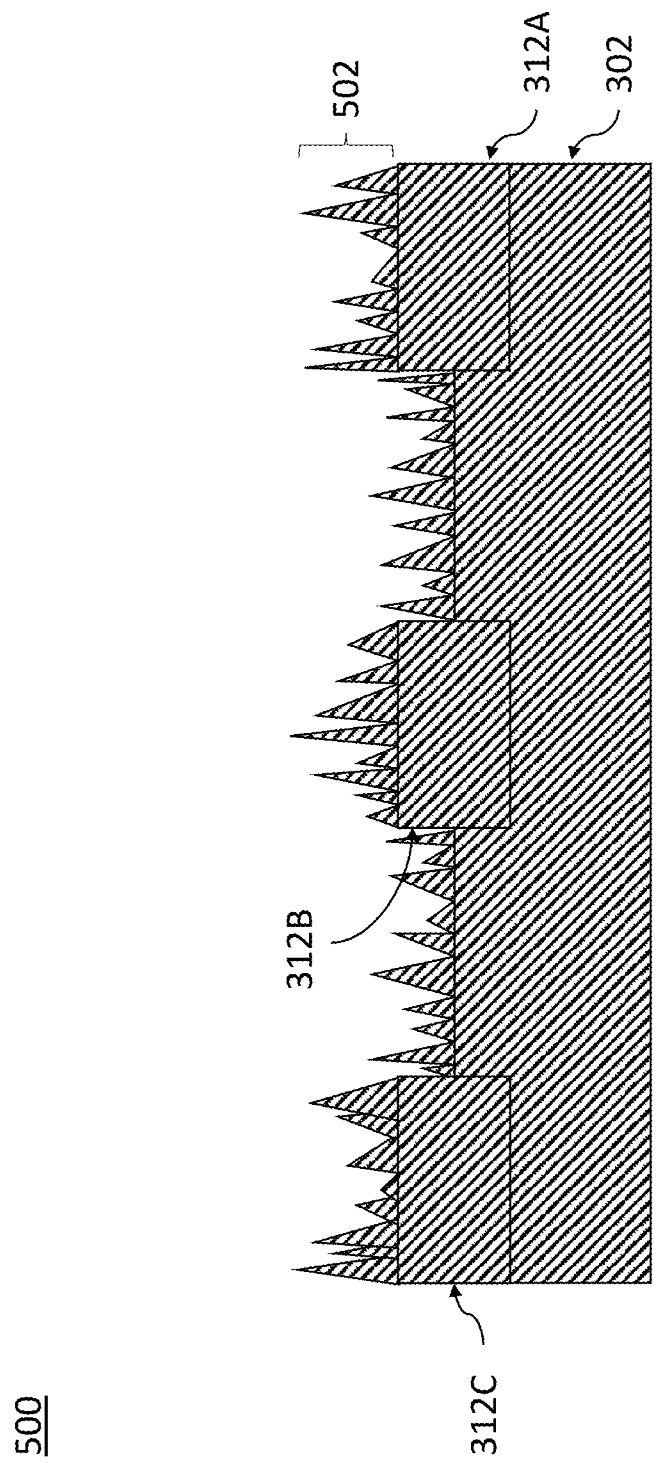
FIG. 5 is a cross-sectional view illustrating a step in the method of forming the plurality of second level antireflective elements for the antireflection optical element according to one embodiment.

As shown in FIG. 4F, the plurality of first level antireflective surface structures 312A-C are provided with a plurality of second level antireflective surface structures 416A-4161 disposed thereon. Like with structures 312A-C, which are protuberances from the optical material 302, the second level of antireflective surface structures 416A-I are protuberances from the first level of antireflective surface structures 312A-C; thus, the second level antireflective surface structures are also protuberances from the optical material 302. In another embodiment, second level antireflective surface structures (like structures 416A-I) may also be formed in between the first level antireflective surface structures by modifying the mask 406 to pattern the photoresist in between the first level antireflective surface structures 312A-C. As discussed above, the dimensions ($W_3$, $D_1$, $W_4$, and $D_2$) of the first and second levels of antireflective surfaces structures 312A-C and 416A-I determine the wavelength range over which the structures 312A-C and 416A-I aid in transmission of light. By the above techniques, first and second level antireflective surface structures 312A-C and 416A-I may be created to aid transmission through an optical element formed from optical material 302 over two wavelength ranges which may partially overlap, but are not identical. However, the invention is not limited to two levels of antireflective surface structures. Additional levels of antireflective surface structures may be disposed on the second level of antireflective surface structures to aid in the transmission of additional wavelength ranges. To make such additional levels, steps S1202-1208 are essentially repeated except with a new mask for each corresponding additional level of antireflective surface structures. Like with the first and second level antireflective surface structures 312A-C and 416A-I, the masks for the additional levels of antireflective surface structures are designed to create a spacing W, between antireflective surface structures for the i-th level based on an wavelength range over which the i-th level of antireflective surface structures are designed to aid in transmission. The height of the i-th level antireflective surface structures are controlled, like with the first and second level of antireflective surface structures, by the etch rate and time.

As discussed above, the dimensions and shapes of the antireflective surface structures may be ordered (by using a mask) or random. While the description herein makes clear that the first level of antireflective surface structures 312A-C may have ordered dimensions and shapes, the invention is not so limited. The first level of antireflective surface structures 312A-C may, in an alternative embodiment, have random dimensions and shapes due to one of the etching techniques described herein to create such features. This does not preclude the presence of a second level of antireflective surfaces with random dimensions and shapes either. A second level of antireflective surface structures may be formed on such a first level of antireflective surface structures by using the etching techniques described herein but in a manner so as to create protuberances that are significantly smaller in size than the protuberances comprising the first level of antireflective surface structures.

Depending on the wavelength ranges over which transmission is sought to be improved, two or more levels of antireflective surface structures may be provided on a surface of an optical element. The dimensions of the antireflective surface structures may be determined based on those wavelength ranges (as described herein) to configure the optical element to transmit over those wavelength ranges. Depending on the optical material used for the optical element, the wavelength range over which transmission could be improved by using two or more levels of antireflective surface structures include the ultraviolet through long wavelength infrared region, from 0.2 to 20 μm. In addition, these wavelength regions for the plurality of levels of antireflective surface structures may overlap. For example, the first level of antireflective surface structures may have some antireflective performance for at least part of a second wavelength region corresponding to the second level of antireflective surface structures, and vice versa.

Figure 13:
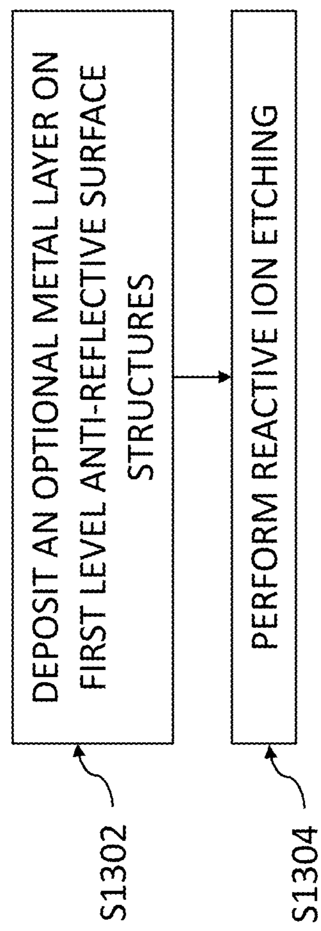
FIG. 13 is a flowchart illustrating another portion of the method of preparing an optical element that includes first and second level antireflective surface structures according to one embodiment.

Having described a method of fabricating second level antireflective surface structures (S1110) using photolithography, another method of fabricating such structures will be explained with reference to FIGS. 13 and 5A-5B.

First, in S1302, a metal layer is optionally deposited on the first level antireflective surface structures 312A-C and the optical material 302. Then, an etching process is performed to create a series of random features 502 on top of the first level of antireflective surface structures 312A-C. This process is described in U.S. patent application Ser. No. 15/812,688 the contents of which are incorporated by reference herein in their entirety. The seed layer is a thin metal layer that is deposited on the surface of the optical material 302 and serves as a "random mask" through which the random antireflective surface features are etched. The seed layer may be removed during the reactive ion etching, or it can be further cleaned off using a chemical etchant following the etching process. However, as mentioned above, the seed layer is not necessary for the ion etching process in all materials and may be optionally provided. In another embodiment, an etching process may be performed without the seed layer to create antireflective structures with random dimensions An alternative method to create the second level antireflective surface features 416A-I with random profiles is to irradiate the optical element 300 with a laser of appropriate wavelength which ablates the material, where the wavelength and pulse length of the laser are dependent on the material to be etched. Having described these methods for creating second level antireflective surface structures 502 that have random dimensions and periodicity, variations of the methods discussed above and specific examples of exemplary optics will be discussed below.

Figure 6B:
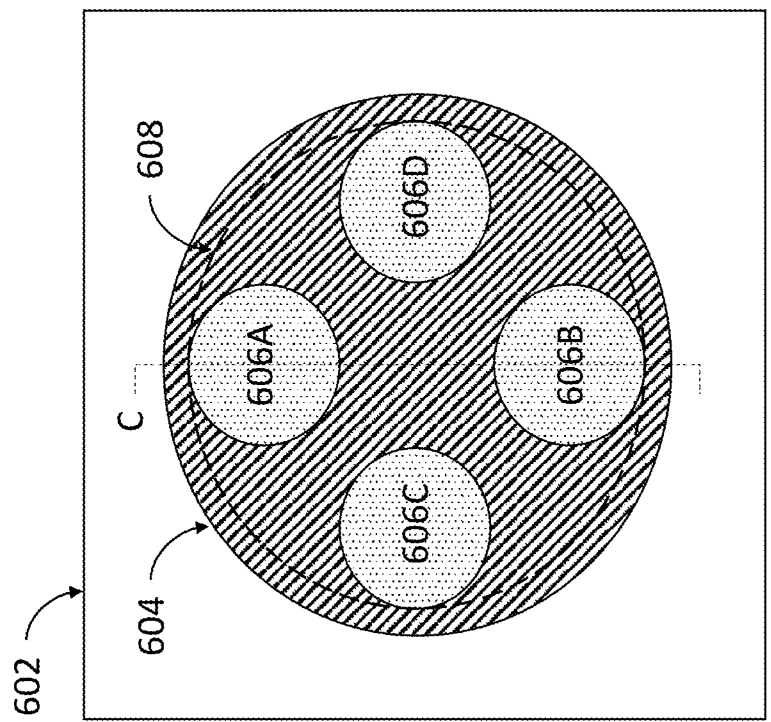
FIG. 6B is a plan view of the first and second level antireflective surface structures shown in FIG. 6A.
Figure 6A:
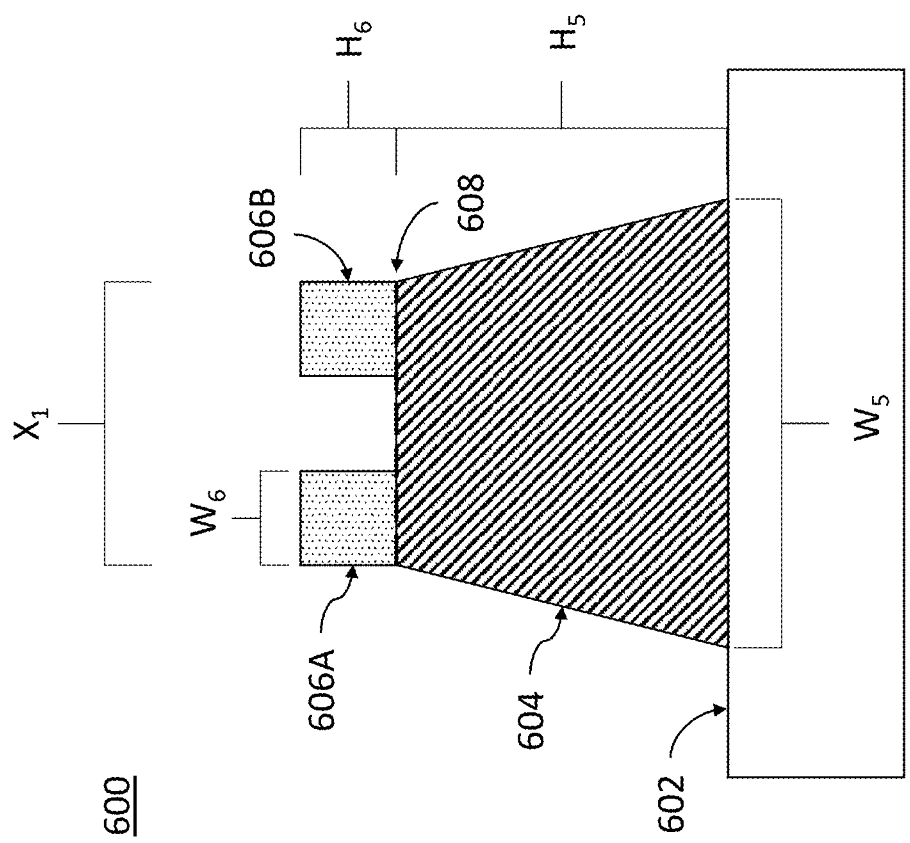
FIG. 6A is a cross-sectional view of first and second level antireflective surfaces structures according to one embodiment.

FIGS. 6A and 6B are cross-sectional and plan views of a portion of optic 600 that includes a plurality of first level antireflective surface structures 604 and a corresponding plurality of second level antireflective surface structures 606A-D formed thereon. FIG. 6A is a cross-sectional view of a first antireflective surface structure 604 and a second antireflective surface structures 606A and 606B taken along the line C in FIG. 6B. As one of ordinary skill will appreciate, the first level antireflective surface structure 604 and the second level antireflective surface structures 606A-D are protuberances from optical material 602, and that a plurality of these structures may be provided across a surface of optical material 602. It should be noted that for ease of understanding the first and second level antireflective surface structures 604 and 606A-D and the optical material 602 have been shown with different fills, but as one of ordinary skill will appreciate these features are preferably formed from the same material, namely optical material 602. The first level antireflective surface structures 604 are preferably formed according to the process described above. As shown in FIG. 6A, the first level antireflective surface structure has a trapezoidal cross-sectional profile with the line 608 denoting the perimeter of the trapezoidal protuberance. As one of ordinary skill will appreciate, known dry etching processes can be optimized to provide straight sidewalls, resulting in features with a rectangular or straight-wall cross section, or with appropriately chosen etch parameters that vary with the material being etched, features with a sloped sidewall such as the trapezoidal profile shown in FIG. 6A, can be created.

Figure 7:
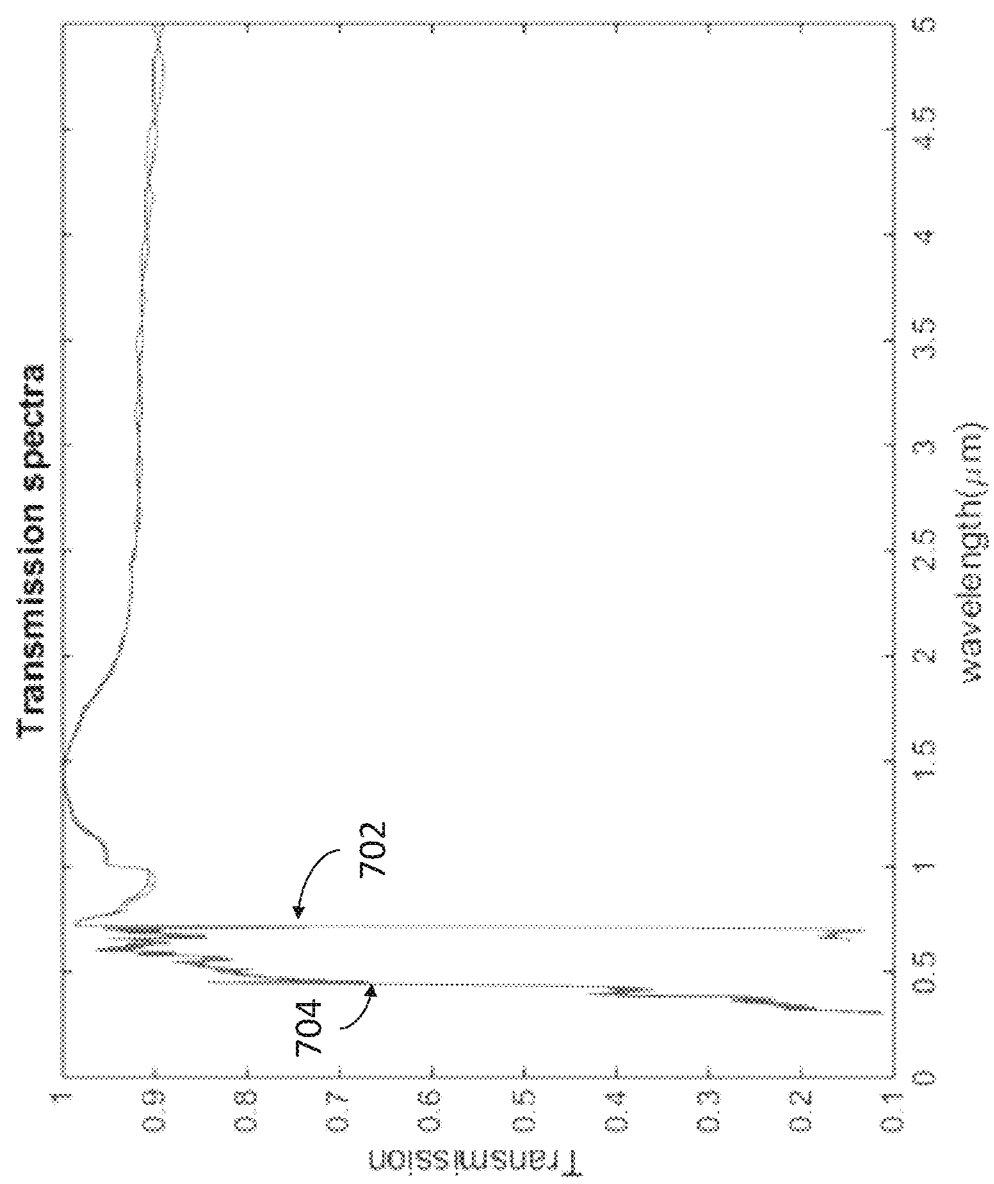
FIG. 7 is a graph showing transmission spectra for an optical element that includes first level antireflective surface structures compared to the same optical element that includes first and second level antireflective surface structures.

As shown in FIG. 6A, the first level antireflective structures 604 have a height ($H_1$) and width ($W_1$) that are chosen to aid in transmission of a first wavelength range as discussed above. Similarly, the second level antireflective structures 606A-D have a height and diameter that are chosen to aid in transmission of a second wavelength range that may, at least, partially overlap with the first wavelength range. In an exemplary embodiment, the values of $W_5$, $H_5$, $W_6$, $H_6$, and Xi are 0.6, 0.9, 0.1, 0.1, and 0.3 microns, respectively. Though not shown in FIG. 6A, an adjoining first level antireflective surface structure may abut the first level antireflective surface structure 604 thus making a center-to-center spacing between the plurality of first level antireflective surface structures 604 equal to the width of structure 604 (0.6 in the exemplary embodiment). In the exemplary embodiment shown in FIG. 6A, the optical material is arsenic trisulfide ($As_2S_3$) glass, but the shape of the first and second level antireflective surface structures may be formed in the other optical materials discussed above. The chosen values of $W_5$ and $H_5$ are designed to increase transmission in the infrared wavelength region. The chosen values of $W_6$ and $H_6$ are designed to increase transmission in the ultraviolet to visible region. FIG. 7 is illustrative.

FIG. 7 shows two transmission spectra. One spectrum 702 is for an $As_2S_3$ optic with just the plurality of first level antireflective structures 604. Another spectrum 704 is for the $As_2S_3$ optic 600 shown in FIGS. 6A and 6B. It is self-evident from FIG. 7 that optic 600 has much greater transmission between 300 nm and approximately 700 nm, roughly corresponding to a portion of the ultraviolet region and the visible region, than the optic with just the plurality of first level antireflective structures. It is also self-evident from FIG. 7 that transmission within the infrared region is approximately the same between an optic with just a first level of antireflective structures 604 and the optic 600 with first level antireflective structures 604 and second level antireflective surface structures 606A-D. This is to be expected as both optics include the first level antireflective surface structures that are designed to aid in transmission of infrared light.

Figure 8B:
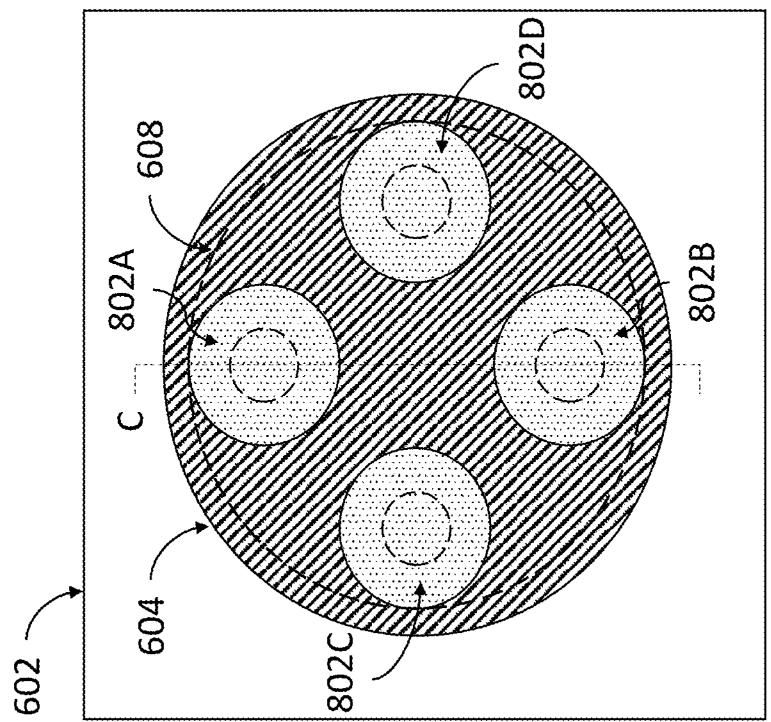
FIG. 8B is a plan view of the first and second level antireflective surface structures shown in FIG. 8A.
Figure 8A:
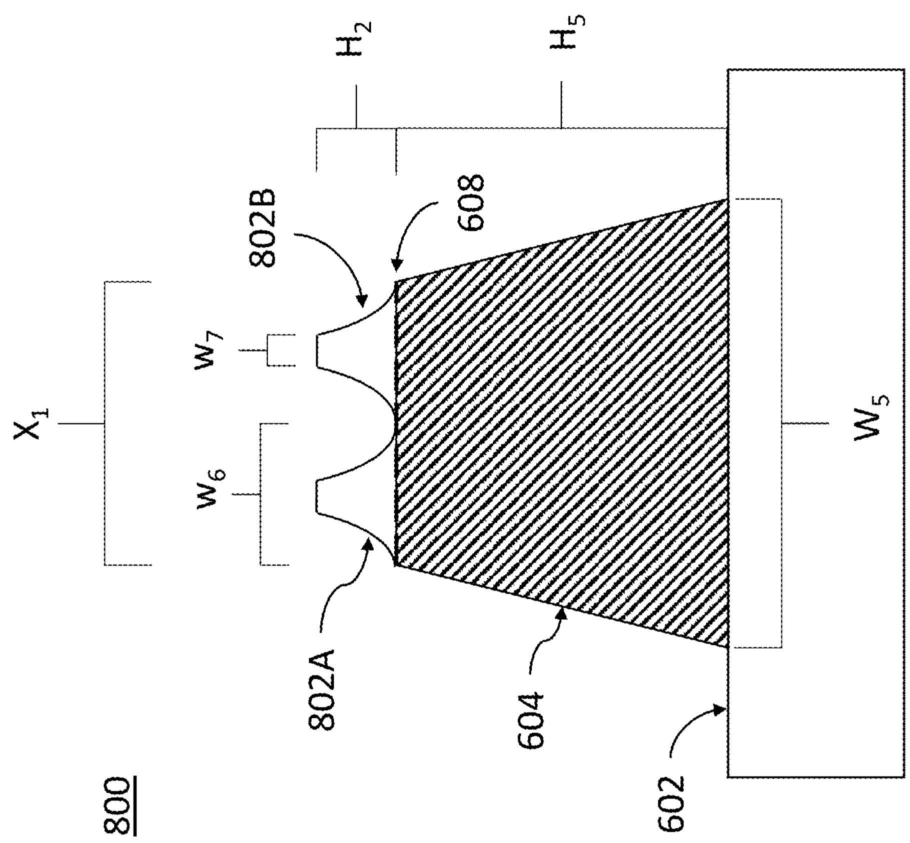
FIG. 8A is a cross-sectional view of first and second level antireflective surfaces structures according to one embodiment.
Figure 9:
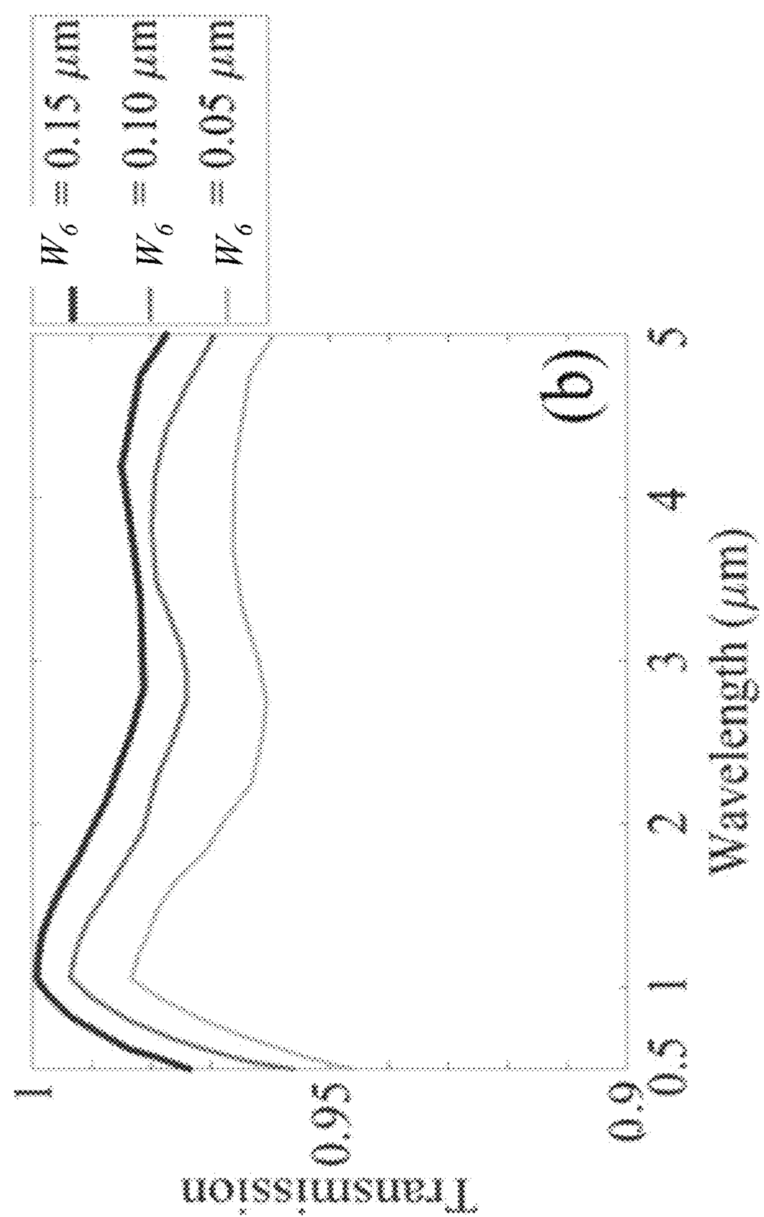
FIG. 9 is a graph of normalized transmission modeled for an optical element designed according to the embodiment shown in FIGS. 8A and B, where a base diameter of the second level antireflective surface structures is varied.

In FIGS. 6A and 6B, the plurality of second level antireflective surface structures 602A-D are depicted as cylinders. That design, however, is merely exemplary. FIGS. 8A and 8B shows yet another exemplary embodiment. FIGS. 8A and 8B are substantially similar to FIGS. 6A and 6B, except the cross-sectional profile of the second level of antireflective surface structures 802A-D is different. Instead of a cylindrical profile, as in FIGS. 6A and 6B, the plurality of second level antireflective surface structures 802A-D have a tapered cylindrical profile where a radius from a vertical coaxial line decreases with increasing height such that a diameter $W_6$ at the base of the second level antireflective surface structure is greater than a diameter $W_7$ at a top of the second level antireflective surface structure. FIG. 9 shows the modeled, normalized transmission amount as a function of wavelength for three different base diameters $W_6$ of the second level antireflective surface structures 802A-D where the optical material 602 is spinel ceramic which transmits from the visible region to the mid-infrared regions. As shown in FIG. 9, as the base diameter increases the transmission amounts also correspondingly increases.

Figure 10:
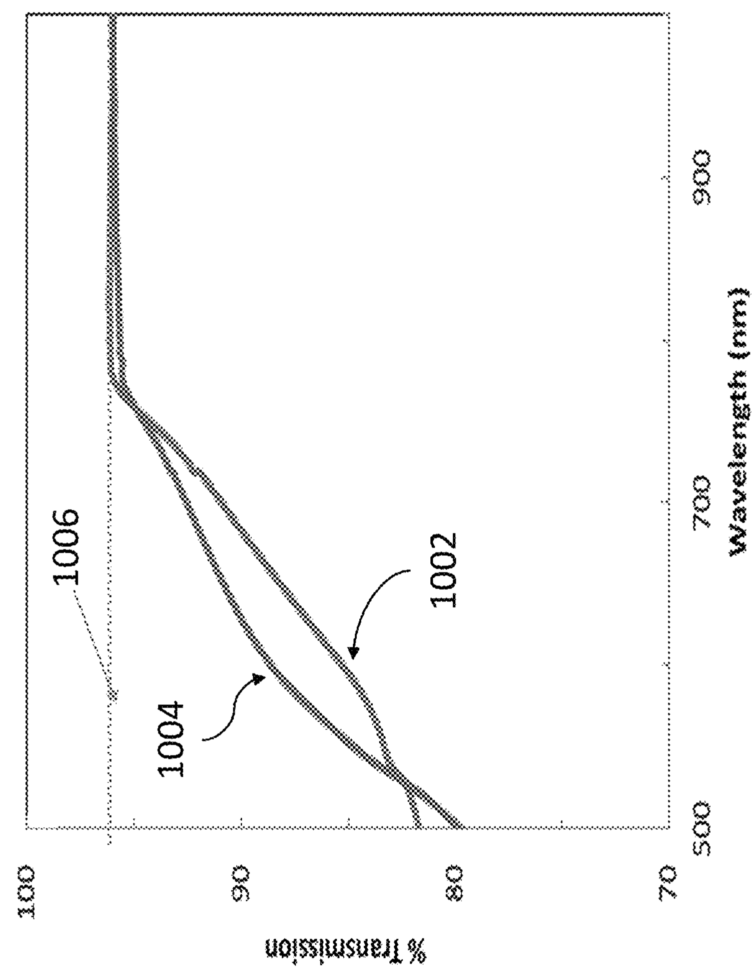
FIG. 10 is a graph showing measured transmission percentage for the optical element of silica glass with only first level antireflective surface structures, as compared to the optical element having first and second level antireflective surface structures.
Figure 11:
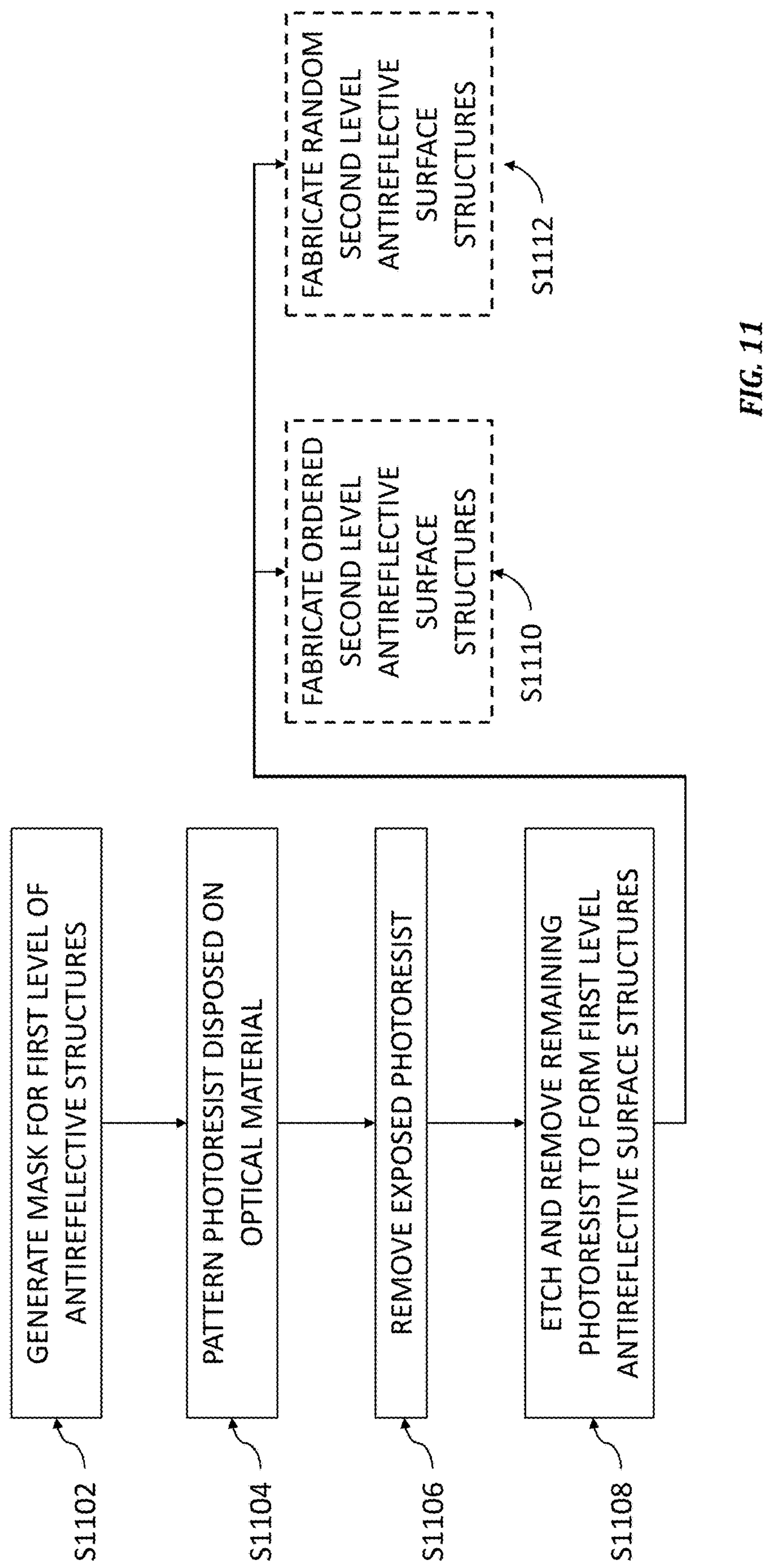
FIG. 11 is a flowchart illustrating a portion of a method of preparing an optical element that includes first and second level antireflective surface structures according to one embodiment.

FIG. 10 is a graph comparing measured transmission percentage between an optic with only first level antireflective surface structures (1002) that are ordered features, an optic with first and second level antireflective surface structures (1004) where the second level antireflective surface structures have random dimensions as discussed above, and a maximum theoretical value (1006). The optic in FIG. 10 is a silica glass, whereby the feature sizes for the ordered antireflective surface structures were optimized for 1 μm transmission. As shown in FIG. 10, with the second level of random AR surface features, there is measured, increased transmission (>3%) in the 550-700 nm wavelength range.

The resulting optical elements (e.g., 300, 400, 500, 600, or 800) may be used in a variety of applications including, but not limited to, windows, lenses, mirrors, end faces of optical fibers, filters, beamsplitters, prisms, gratings, and diffusers. An optic produced by the method herein may be flat, curved, cone-shaped, or an asphere.

While various example embodiments of the invention have been described above, it should be understood that they have been presented by way of example, and not limitation. It is apparent to persons skilled in the relevant art(s) that various changes in form and detail can be made therein. Thus, the disclosure should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An antireflection optical element, comprising:

an optical material that includes:

a first plurality of antireflective surface structures in the form of first protuberances from the optical material, wherein the first plurality of antireflective surface structures are constructed to aid in transmission of a first wavelength range through the optical material, and a second plurality of antireflective surface structures in the form of second protuberances from the first plurality of antireflective surface structures, wherein the second plurality of antireflective surface structures are constructed to aid in transmission of a second wavelength range through the optical material, and wherein the first wavelength range comprises longer wavelengths than the second wavelength range, wherein individual heights of the first plurality of antireflective surface structures are random and vary within a range of 0.1 to 10 of one-half a first nominal wavelength within the first wavelength range, and wherein individual heights of the second plurality of antireflective surface structures are random and vary within a range of 0.1 to 10 of one-half a second nominal wavelength within the second wavelength range.

2. The antireflection optical element of claim 1, wherein the second plurality of antireflective surface structures have tapered cylindrical cross-sectional profiles where a radius measured from a vertical axis decreases with increasing height such that a diameter at a base of a second antireflective surface structure is greater than a diameter at a top of the second antireflective surface structure.

3. The antireflection optical element of claim 1, wherein the optical material is one of: glass, crystal, ceramic or semiconductor material.

4. The antireflection optical element of claim 1, wherein a cross-sectional shape of the second plurality of antireflective surface structures is different from a cross-sectional shape of the first plurality of antireflective surface structures.

5. The antireflection optical element of claim 1, further comprising:

a third plurality of antireflective surface structures in the form of third protuberances from the second plurality of antireflective surface structures, wherein the third plurality of antireflective surface structures are constructed to aid in transmission a third wavelength range through the optical material.

6. The antireflection optical element of claim 1, wherein the first wavelength range and the second wavelength range partially overlap.

7. The antireflection optical element of claim 1, wherein the optical material is spinel ceramic.

8. The antireflection optical element of claim 1, wherein center-to-center spacings between adjacent first antireflective surface structures, of the first plurality of antireflective surface structures, are 0.1 to 10 times a first nominal center-to-center spacing, wherein the first nominal center-to-center spacing is less than the first nominal wavelength divided by twice a refractive index of the optical material, wherein center-to-center spacings between adjacent second antireflective surface structures, of the second plurality of antireflective surface structures, vary by a factor of are 0.1 to 10 times a second nominal center-to-center spacing, and wherein the second nominal center-to-center space is less than 0.1 to 10 times the second nominal wavelength divided by twice the refractive index of the optical material.

9. The antireflection optical element of claim 1, wherein a cross-sectional shape of the second plurality of antireflective surface structures is different from a cross-sectional shape of the first plurality of antireflective surface structures, and wherein the second plurality of antireflective surface structures have tapered cylindrical cross-sectional profiles where a radius measured from a vertical axis decreases with increasing height such that a diameter at a base of a second antireflective surface structure is greater than a diameter at a top of the second antireflective surface structure.

* * * * *